US009445005B2

United States Patent
Seita

(10) Patent No.: US 9,445,005 B2
(45) Date of Patent: Sep. 13, 2016

(54) OPTICAL DEVICE CAPABLE OF SELECTING FOCUS DETECTION POINT, METHOD OF CONTROLLING THE SAME, AND STORAGE MEDIUM

(71) Applicant: CANON KABUSHIKI KAISHA, Tokyo (JP)

(72) Inventor: Masato Seita, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 46 days.

(21) Appl. No.: 14/335,407

(22) Filed: Jul. 18, 2014

(65) Prior Publication Data
US 2015/0022682 A1  Jan. 22, 2015

(30) Foreign Application Priority Data

Jul. 22, 2013 (JP) ................................ 2013-151477
Jul. 22, 2013 (JP) ................................ 2013-151478

(51) Int. Cl.
H04N 5/232 (2006.01)
(52) U.S. Cl.
CPC ...... *H04N 5/23245* (2013.01); *H04N 5/23212* (2013.01); *H04N 5/23219* (2013.01); *H04N 5/23293* (2013.01); *G03B 2213/025* (2013.01)
(58) Field of Classification Search
CPC .................... H04N 5/23245; H04N 5/23212; H04N 5/23219; H04N 5/23293; G03B 2213/025
See application file for complete search history.

(56) References Cited

U.S. PATENT DOCUMENTS

2005/0264679 A1  12/2005 Sasaki et al.
2011/0228053 A1*  9/2011 Aoki .................. H04N 5/23212
348/49

FOREIGN PATENT DOCUMENTS

| JP | 06-034873 A | 2/1994 |
| JP | 07-218813 A | 8/1995 |
| JP | 07218813 A * | 8/1995 |
| JP | 2001-330882 A | 11/2001 |
| JP | 2005-338352 A | 12/2005 |
| JP | 2007-024587 A | 2/2007 |

* cited by examiner

*Primary Examiner* — Ahmed A Berhan
(74) *Attorney, Agent, or Firm* — Rossi, Kimms & McDowell LLP

(57) ABSTRACT

An optical device capable of selecting a focus detection point from a plurality of focus detection points for focus detection, such that the selection is performed while causing a user's intention to be reflected thereon. The optical device performs focus detection at a focus detection point selected from focus detection points in a predetermined photographing range. A face area is detected from an object image in the photographing range. The line of sight of a user is detected in the photographing range. A photographing mode is selected from a plurality of photographing modes. The priorities of face detection and sight line detection are determined according to the selected photographing mode. A focus detection point at which the focus detection is performed is determined according to the priorities.

14 Claims, 16 Drawing Sheets

PORTRAIT MODE

M1

TRAVEL MODE

M2

TRIPOD MODE

M5

GROUP PHOTOGRAPH MODE

M3

SPORT MODE

M4

FACE DETERMINATION RANGE FOR PHOTOGRAPHING MODE

|  | SINGLE PHOTOGRAPHING | CONTINUOUS PHOTOGRAPHING |
|---|---|---|
| SIGHT LINE DETECTION PRIORITY | 100% | 150% |
| FACE DETECTION PRIORITY | 200% | 300% |

FIG. 7

TIMER RATIOS ASSOCIATED WITH
EACH PHOTOGRAPHING MODE

|  | SINGLE PHOTOGRAPHING | CONTINUOUS PHOTOGRAPHING |
|---|---|---|
| PORTRAIT MODE | 1.5 | 0.7 |
| TRAVEL MODE | 1.0 | 0.5 |
| GROUP PHOTOGRAPH MODE | 2.0 | 1.0 |
| SPORT MODE | 0.5 | 0.2 |
| TRIPOD MODE | 1.0 | 0.5 |

OPTICAL DEVICE CAPABLE OF SELECTING FOCUS DETECTION POINT, METHOD OF CONTROLLING THE SAME, AND STORAGE MEDIUM

BACKGROUND OF THE INVENTION

1. Field of the Invention

The present invention relates to an optical device that is capable of selecting a focus detection point, a method of controlling the same, and a storage medium, and more particularly to an optical device that performs focus detection at a focus detection point which is selected from a plurality of focus detection points.

2. Description of the Related Art

In general, in optical devices, such as a digital camera, there has been known one configured to select a ranging point (focus detection point) according to information on the sight line of a viewfinder observer, object information, and a ranging point-selecting operation by a photographer. Further, there have been proposed various optical devices which have an object detection function for detecting information on an object (object information) (see e.g. Japanese Patent Laid-Open Publication No. 2005-338352).

The optical device described in Japanese Patent Laid-Open Publication No. 2005-338352 performs detection of eyes of a person (object) included in an image obtained by an image pickup section, and sets a focus frame indicative of the position and size of the object on which the camera is to be focused, according to the result of the detection, thereby detecting an in-focus position for photographing.

Further, there have been proposed various optical devices having a sight line detection function for detecting the line of sight of a viewfinder observer, (see e.g. Japanese Patent Laid-Open Publication No. H07-218813).

An optical device described in Japanese Patent Laid-Open Publication No. H07-218813 has an automatic setting mode, a sight line detection mode, and a manual setting mode, as modes for selecting a ranging point, and one of these modes is selected by switching therebetween using a slide switch. Further, in a case where the ranging point is being set in the sight line detection mode, if a signal for manual setting of the ranging point is input by an operation of the user, the priority is given to the input for the manual setting to thereby cause the intention of a photographer (user) to be reflected on the setting of the ranging point.

In addition, some optical devices including a digital camera have a touch panel mounted on a display that displays an object image, and are configured such that a ranging point is selected by a touch operation.

However, when a ranging point is selected by the above-mentioned object detection function, the ranging point is sometimes erroneously detected depending on the size, color, and brightness of an object. On the other hand, in detecting the line of sight using the sight line detection function, a difference is generated in the detection of the line of sight, depending on an eyeball of an individual observer (i.e. user), which one of right and left eyes the observer uses for observation, etc. Even when this difference is corrected e.g. by calibration, it is sometimes difficult to select a ranging point as intended by the photographer.

In addition, in Japanese Patent Laid-Open Publication No. H07-218813, setting a ranging point using both of the object detection function and the sight line detection function is not performed. Further, there is no description about how to determine a ranging point by selecting, using the sight line detection function, between a plurality of ranging points set using the object detection function. Further, there is no description about how to determine a ranging point in a case where a ranging point selecting operation (i.e. a change of the ranging point) by a photographer is performed after the ranging point has been selected using the object detection function and the sight line detection function.

Further, in a case where a user performs photographing while looking into a viewfinder of an optical device, such as a single lens reflex camera, even if the display device is equipped with a touch panel, to select the ranging point using the touch panel, the user has to move the line of sight from the viewfinder to the display device, and hence it is difficult to select the ranging point by a touch operation.

SUMMARY OF THE INVENTION

The present invention provides an optical device that is capable of selecting a focus detection point from a plurality of focus detection points for focus detection, such that the selection is performed while causing a user's intention to be reflected thereon, a method of controlling the same, and a storage medium.

In a first aspect of the present invention, there is provided an optical device that has a plurality of focus detection points in a predetermined imaging area, and performs focus detection at a focus detection point which is selected from the plurality of focus detection points, comprising a first detection unit configured to detect a predetermined area from an object image in the imaging area, a second detection unit configured to detect a position of a line of sight of a user in the imaging area, a mode selection unit configured to select a photographing mode from a plurality of photographing modes, a priority determination unit configured to determine priorities of the first detection unit and the second detection unit according to the photographing mode selected by the mode selection unit, and a focus detection point determination unit configured to determine a focus detection point at which the focus detection is to be performed, according to the priorities determined by the priority determination unit.

In a second aspect of the present invention, there is provided a method of controlling an optical device that has a plurality of focus detection points in a predetermined imaging area, and performs focus detection at a focus detection point which is selected from the plurality of focus detection points, comprising detecting a predetermined area from an object image in the imaging area, detecting a position of a line of sight of a user in the imaging area, selecting a photographing mode from a plurality of photographing modes, determining priorities of detection of the predetermined area and detection of the position of the line of sight, according to the photographing mode selected by said selecting, and determining a focus detection point at which the focus detection is to be performed, according to the priorities determined by said determining.

In a third aspect of the present invention, there is provided a non-transitory computer-readable storage medium storing a computer-executable control program for causing a computer to execute a method of controlling an optical device that has a plurality of focus detection points in a predetermined imaging area, and performs focus detection at a focus detection point which is selected from the plurality of focus detection points, wherein the method comprises detecting a predetermined area from an object image in the imaging area, detecting a position of a line of sight of an user in the imaging area, selecting a photographing mode from a plurality of photographing modes, determining priorities of detection of the predetermined area and detection of the position of the line of sight, according to the photographing mode selected by said selecting, and determining a focus detection point at which the focus detection is to be performed, according to the priorities determined by said determining.

With the configuration of the present invention, according to a selected photographing mode, priorities are set to detection of a predetermined area of an object image and detection of a sight line position, respectively, or priorities are set to a change of the focus detection point responsive to the detection of a predetermined area of an object image and a change of the focus detection g point by a user's operation, respectively, whereby a focus detection point at which focus detection is performed is determined according to the setting of the priorities. This causes the focus detection point to be selected according to the user's intension and makes it possible to improve the convenience in selecting the ranging point. Note that the term "focus detection" refers to "detecting a focusing condition".

Further features of the present invention will become apparent from the following description of exemplary embodiments (with reference to the attached drawings).

BRIEF DESCRIPTION OF THE DRAWINGS

FIGS. 4A to 4E are diagrams showing photographing modes between which switching is performed by a ranging point priority selection section appearing in FIG. 3, in which FIG. 4A shows a portrait mode, FIG. 4B shows a travel mode, FIG. 4C shows a group photograph mode, FIG. 4D shows a sport mode, and FIG. 4E shows a tripod mode.

FIG. 7 is a table of ratios of timer time periods set according to the photographing mode and photographing speed setting.

DESCRIPTION OF THE EMBODIMENTS

The present invention will now be described in detail below with reference to the accompanying drawings showing embodiments thereof.

Figure 1A:
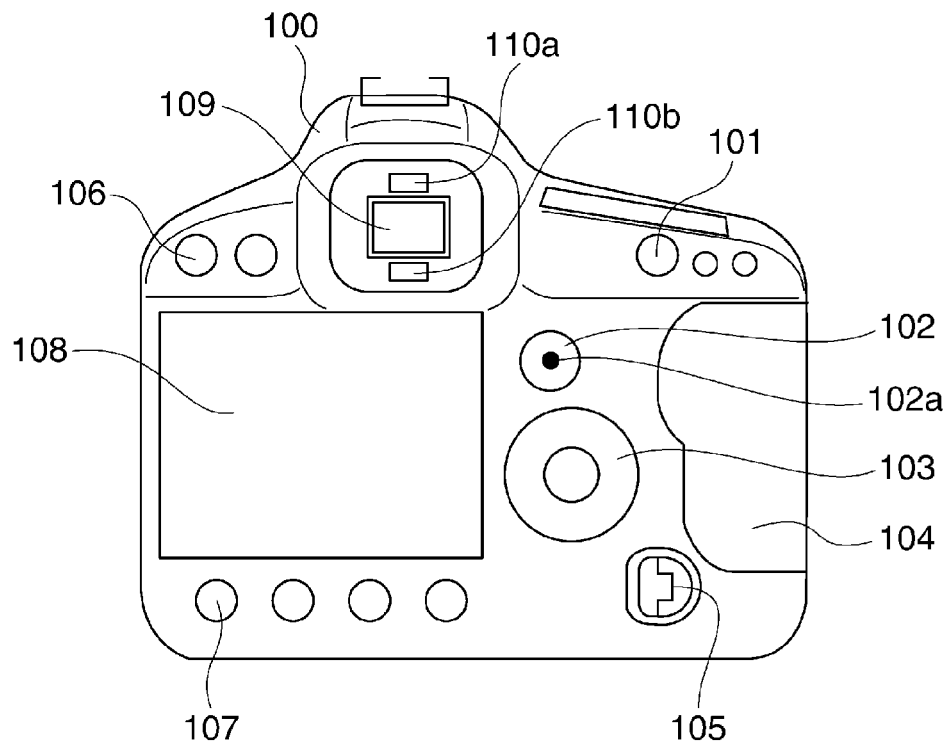
FIG. 1A is a rear view showing the appearance of an example of an optical device (camera) according to an embodiment of the present invention.
Figure 1B:
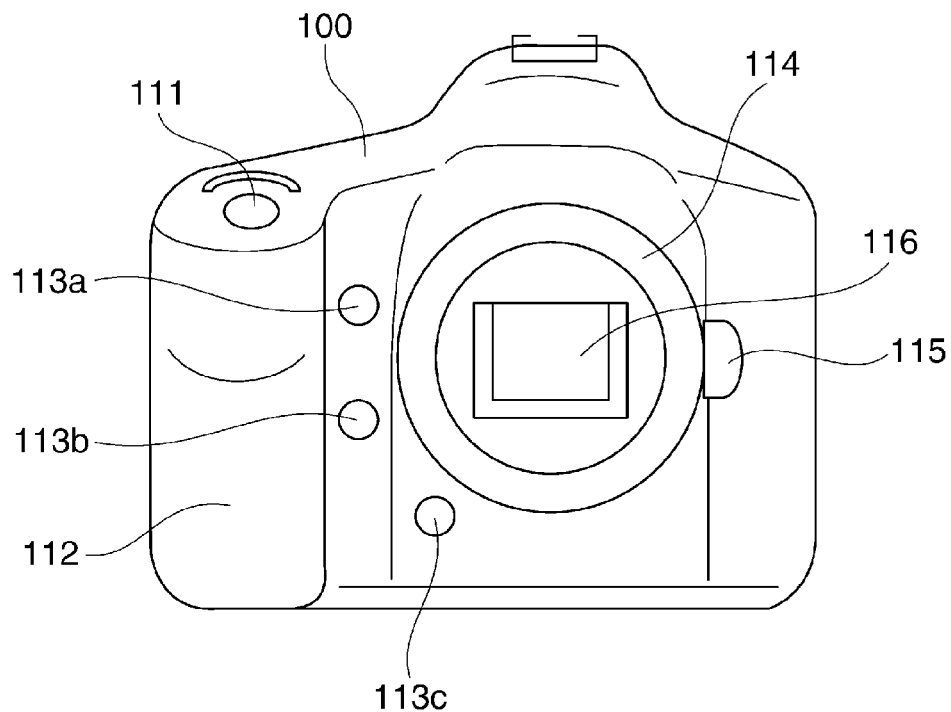
FIG. 1B is a front view showing the appearance of the example of the optical device according to the embodiment of the present invention.

FIGS. 1A and 1B are views showing the appearance of an example of an optical device according to an embodiment of the present invention, in which FIG. 1A is a rear view, and FIG. 1B is a front view.

The illustrated optical device is a so-called lens-interchangeable single-lens reflex camera (hereinafter simply referred to as the camera), and the camera includes a camera body 100. Before starting photographing, for example, a user depresses a menu button 106 for displaying a photographing menu to make settings of photographing conditions, etc. The user can change various settings using a dial 103.

Sight line detection sections 110*a* and 110*b* are arranged at respective locations above and below a viewfinder equipped with an eyepiece optical system 109. When the user (also referred to as the photographer) looks into the viewfinder to view an object image, the line of sight of the photographer is detected by the sight line detection sections 110*a* and 110*b*, and a point on the object, observed by the photographer through the viewfinder, is determined.

When a ranging start button (ranging switch) 101 is pressed, a distance measuring operation is performed. However, the photographer can change the ranging point (focus detection point) using a ranging point selection section (multi controller: hereinafter referred to as the MC) 102. The MC 102 includes a switch member which can be operated in the eight directions of upward, downward, left, and right directions, and oblique directions between them, and by pressing a central portion 102*a* of the switch member, the photographer can select the ranging point.

A release button (release switch) 111 has a function of a two-stage pressing switch in which photometry and distance measurement are started at the first stage, and a release operation is performed at the second stage. By the release operation, a main mirror 116 which reflects the object image to the viewfinder is retreated from a photographing optical path O, and photographing is executed.

When a replay button 107 for viewing a photographed image is pressed, a photographed image is displayed on a display monitor (image display section) 108. Further, the photographed image is recorded in an external storage device (not shown). By operating an operation member 105, an external storage device removal cover 104 is opened, and the user can take out the external storage device from the camera body 100. A lens attachment/removal button 115 is provided at a location close to a mount section 114 for fixing a photographic lens unit (hereinafter simply referred to as a photographic lens or an interchangeable lens) to the camera body 100, and the user can replace the photographic lens by operating the lens attachment/removal button 115.

Ranging point priority selection sections 113a, 113b, and 113c are arranged near a grip section 112 that enables the user to hold the camera body 100 with his/her right hand, and the user can operate the ranging point priority selection sections 113a, 113b, and 113c with a fingertip while holding the grip section 112.

Figure 2:
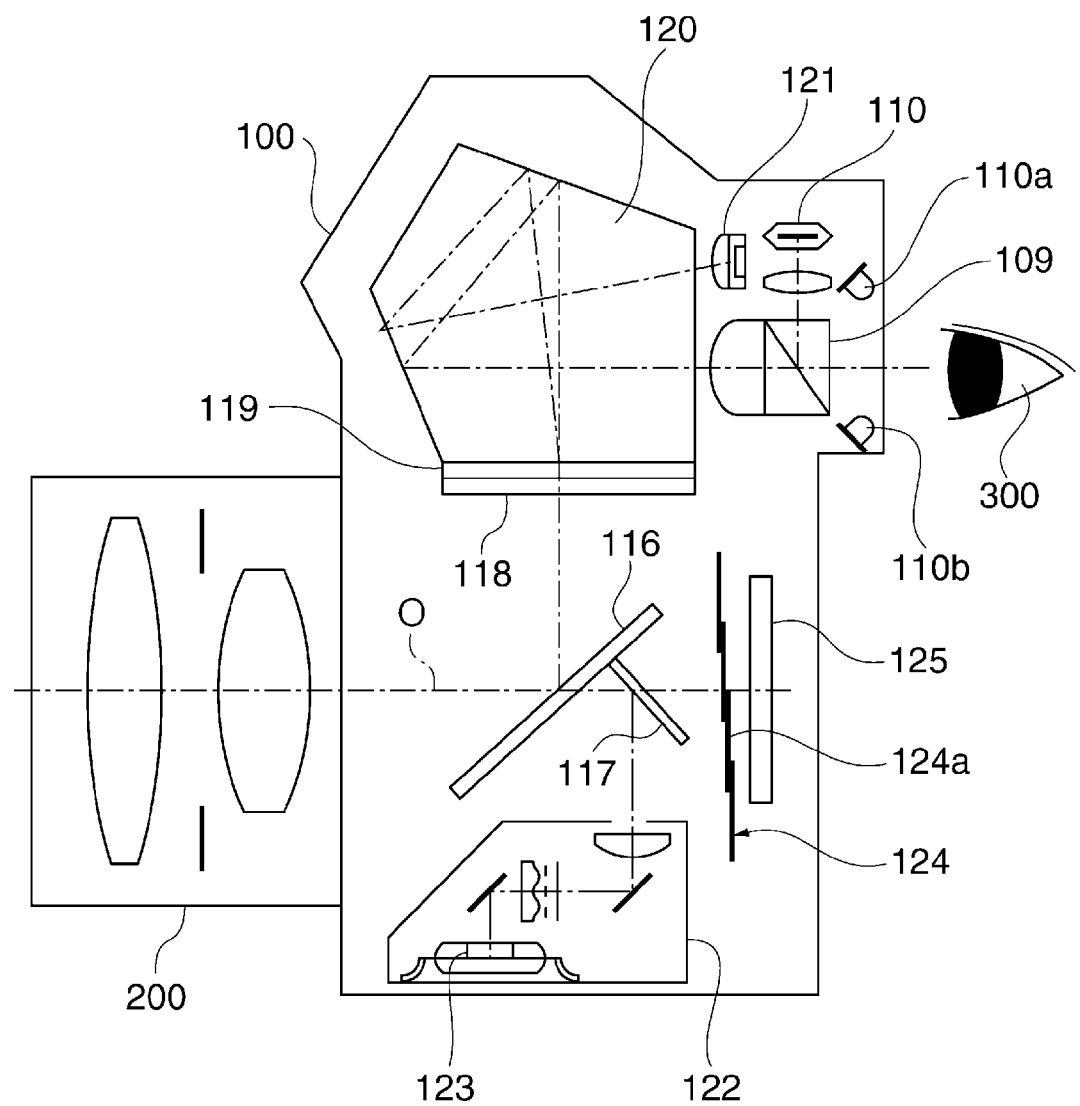
FIG. 2 is a schematic cross-sectional view of the optical device in a state in which an interchangeable lens has been mounted on a camera body of the camera appearing in FIGS. 1A and 1B.

FIG. 2 is a schematic cross-sectional view of the camera in a state in which an interchangeable lens 200 has been mounted on the camera body 100 appearing in FIGS. 1A and 1B.

The main mirror 116 appearing in FIG. 2 has semi-transparent part, and an object image (optical image) passing through the interchangeable lens (photographic lens) 200 is reflected by the main mirror 116, whereby the reflected image is formed on a focusing plate 118. On the other hand, the optical image transmitted through the main mirror 116 (i.e. transmitted image) is reflected by a sub mirror 117, and enters a focus detection device 122. Then, the transmitted image is formed on a ranging section 123 which is a focus detection element.

The image formed on the focusing plate 118 enters an eyeball 300 of the photographer via a pentaprism 120 and the eyepiece optical system 109. Further, a dichroic mirror (not shown) is provided on part of the eyepiece optical system 109. That is, a imaging area is displayed in the viewfinder formed by the pentaprism 120 and the eyepiece optical system 109.

The sight line detection sections 110a and 110b, described with reference to FIGS. 1A and 1B, are each provided with an infrared light-emitting diode (not shown), and infrared light is projected from the sight line detection sections 110a and 110b toward the eyeball 300. A sight line detection section 110 monitors the eyeball 300 via the above-mentioned dichroic mirror to thereby detect the line of sight of the photographer.

Detection of the line of sight has been described in detail e.g. in Japanese Patent Laid-Open Publication No. H06-34873, and hence description thereof is omitted.

A photometry section 121, which is disposed on a light exiting side of the pentaprism 120, is an area sensor capable of detecting not only brightness of an object image but also a face and color of the object. Face detection has been described in detail e.g. in Japanese Patent Laid-Open Publication No. 2001-330882, and hence description thereof is omitted.

A transmission type liquid crystal (ranging point-displaying section) 119 is disposed between the focusing plate 118 and the pentaprism 120, and a plurality of ranging points are displayed on the transmission type liquid crystal 119. This enables the photographer to observe an object image on the focusing plate 118 with a plurality of ranging points superimposed thereon.

A shutter 124 is disposed downstream of the main mirror 116, and an image pickup device 125, such as a CMOS image sensor, is disposed downstream of the shutter 124. When performing a photographing operation, exposure control is performed using the shutter 124 and a diaphragm, not shown, of the photographic lens 200 according to an output from the photometry section 121. Then, the main mirror 116 and the sub mirror 117 are retracted from the photographing optical path (through which the optical axis of the photographic lens 200 extends), the object image is formed on the image pickup device 125, whereby image pickup is performed.

Figure 3:
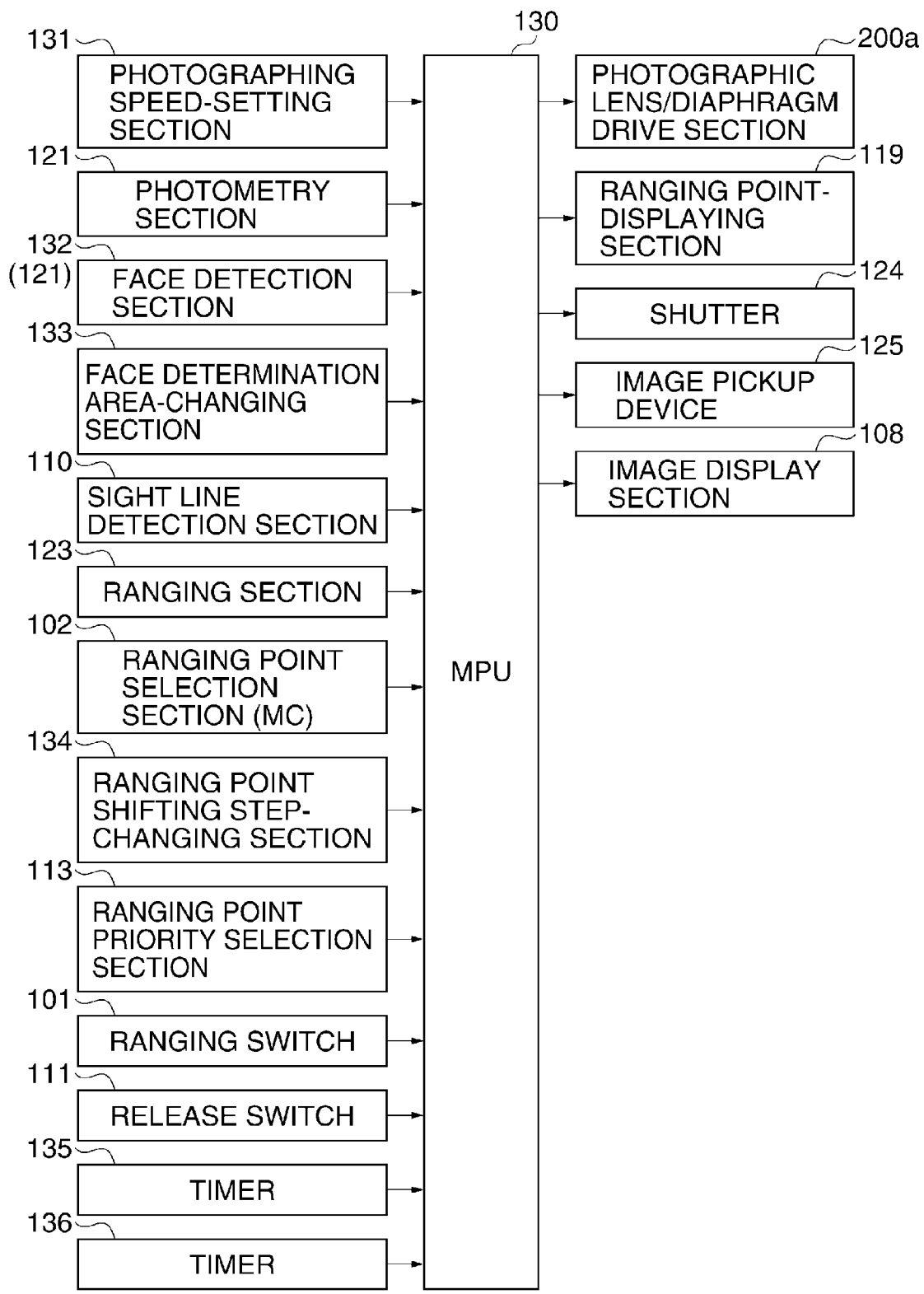
FIG. 3 is a block diagram of a control system of the camera shown in FIG. 2.

FIG. 3 is a block diagram of a control system of the camera shown in FIG. 2.

The camera shown in FIG. 2 is provided with an MPU (controller) 130. A photographing speed-setting section 131 is provided for setting a photographing speed for single photographing or continuous photographing, and sends a photographing speed signal indicative of a photographing speed to the MPU 130 according to photographer's operations of the menu button 106 and the dial 103, described with reference to FIGS. 1A and 1B.

By performing detection on an object, the photometry section 121 obtains object information such as brightness, a face, and color of an object image, as mentioned hereinabove. In the present embodiment, the photometry section 121 also functions as a face detection section 132, and sends the object information to the MPU 130. A range in an object image (i.e. image) for face detection is changed by a face determination area-changing section 133. The setting and change of the face detection range will be described hereinafter.

The sight line detection section 110 (formed by the sight line detection sections 110a and 110b, appearing in FIGS. 1A and 1B) detects the line of sight of the photographer, and sends sight line detection information to the MPU 130. The ranging section 123 sends distance information indicative of a distance from the camera to an object to the MPU 130. As mentioned hereinabove, the ranging point can be shifted by using the MC 102, which is the ranging point selection section, and an amount of shift of the ranging point is determined by a ranging point shifting step-changing section (ranging point shift-changing unit) 134.

The user can view a ranging point shifting step-changing screen (not shown) displayed by operating the menu button 106 appearing in FIGS. 1A and 1B, and input a ranging point shifting step by operating the dial 103. In the present embodiment, setting can be made such that the ranging point is shifted a plurality of steps, such as two steps or three steps, by one input, differently from a conventional one step by one input.

A ranging point priority selection section 113 (formed by the ranging point priority selection section buttons 113a to 113c appearing in FIG. 1B) determines priorities, for ranging point selection, of respective functions (hereinafter referred to as "ranging point priorities") of the face detection section 132, the sight line detection section 110, and the ranging point selection section (MC) 102, whereby a ranging point to be selected is changed by the ranging point priority selection section 113. The operation of the ranging point priority selection section 113 will be described hereinafter.

Distance measurement, photometry, face detection, and sight line detection at the ranging point selected in the manner described above are started by operating the ranging start button (ranging switch) 101 or operating the release button (release switch) 111 to the first step, and a photographing start signal is input from the release switch 111 to the MPU 130 by operating the release button 111 to the second step.

A timer 135 is used for counting time from switching-on of the ranging start button 101 to switching-on of the release button 111. If the release button 111 is not switched on even when a predetermined time period (timer time period) elapses after switching-on of the ranging start button 101, the MPU 130 restarts the face detection and the sight line detection according to the ranging point priorities set as mentioned above. Then, the count value (timer time period) counted by the timer 135 is reset. A timer 136 is used for counting time during which the ranging point is permitted to be shifted by operating the MC 102.

A photographic lens/diaphragm drive section 200a is provided on the photographic lens 200, for driving the photographic lens 200 (i.e. a focus lens provided in the photographic lens 200) to an in-focus position and performing aperture control under the control of the MPU 130. On the transmission type liquid crystal (i.e. ranging point-displaying section) 119a, a selected one of display frames of respective ranging points is displayed in an illuminated state.

When the release button 111 is switched on, the MPU 130 causes a drive circuit (not shown) to cause shutter blades 124a of the shutter 124 to travel. Then, the image pickup device 125 is exposed by traveling of the shutter blades. As a consequence, an image obtained by the image pickup device 125 is recorded in an external recording device, and is displayed on the display monitor (image display section) 108.

Figure 4A:
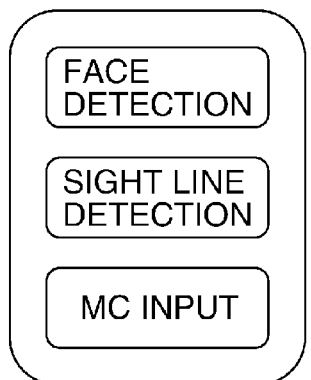
Figure 4B:
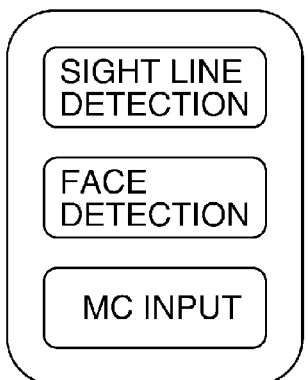
Figure 4E:
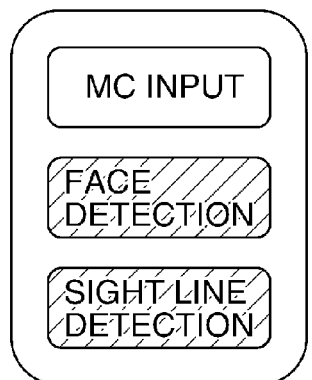
Figure 4C:
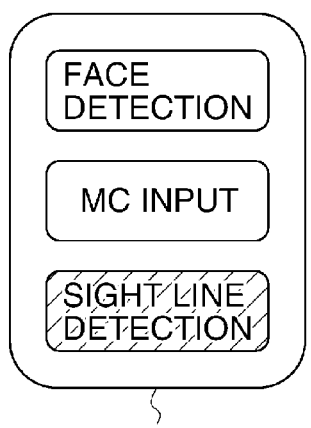
Figure 4D:
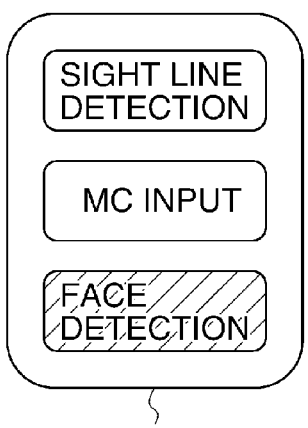

FIGS. 4A to 4E are diagrams showing photographing modes between which switching is performed by the ranging point priority selection section 113 appearing in FIG. 3. FIG. 4A shows a portrait mode, FIG. 4B shows a travel mode, FIG. 4C shows a group photograph mode, FIG. 4D shows a sport mode, and FIG. 4E shows a tripod mode.

Now, when the portrait mode (first photographing mode) M1 shown in FIG. 4A is set as the photographing mode, the ranging point priority selection section 113 sets the first priority to the face detection section 132, the second priority to the sight line detection section 110, and the third priority to the ranging point selection section (MC) 102.

When the travel mode M2 shown in FIG. 4B is set as the photographing mode, the ranging point priority selection section 113 sets the first priority to the sight line detection section 110, the second priority to the face detection section 132, and the third priority to the ranging point selection section (MC) 102.

Similarly, when the group photograph mode (third photographing mode) M3 shown in FIG. 4C is set as the photographing mode, the ranging point priority selection section 113 sets the first priority to the face detection section 132, the second priority to the ranging point selection section (MC) 102, and the third priority to the sight line detection section 110.

Further, when the sport mode (second photographing mode) M4 shown in FIG. 4D is set as the photographing mode, the ranging point priority selection section 113 sets the first priority to the sight line detection section 110, the second priority to the ranging point selection section (MC) 102, and the third priority to the face detection section 132.

Furthermore, when the tripod mode M5 shown in FIG. 4E is set as the photographing mode, the ranging point priority selection section 113 sets the first priority to the ranging point selection section (MC) 102, the second priority to the face detection section 132, and the third priority to the sight line detection section 110.

In the illustrated example, in the group photograph mode M3, the function of the sight line detection section 110 whose priority is the third is stopped. Similarly, in the sport mode M4, the function of the face detection section 132 whose priority is the third is stopped, and in the tripod mode M5, the functions of the face detection section 132 and the sight line detection section 110 whose priorities are the second and third are stopped.

One of the photographing modes, shown in FIGS. 4A to 4E, is set by the ranging point priority selection section 113 as described above, and for example, the button 113a appearing in FIG. 1B is used as a button for changing the photographing mode to one of the portrait mode M1, the travel mode M2, and the tripod mode M5. Further, the button 113b appearing in FIG. 1B is used as a button for changing the photographing mode from the portrait mode M1 to the group photograph mode M3, and a button for changing the photographing mode from the travel mode M2 to the sport mode M4. Further, when an input by the MC 102 is inhibited in a photographing operation, as will be described hereinafter, the button 113c is used as a button for temporarily permitting the ranging point to be shifted according to the input by the MC 102.

By switching the photographing mode by operating the above-mentioned buttons 113a to 113c, the user can easily select the ranging point priorities while holding the grip section 112. Further, even when the photographing situation is changed while the user is looking into the viewfinder, the use can quickly change the setting of the photographing mode to the optimum mode.

Figures 5A, 5B:
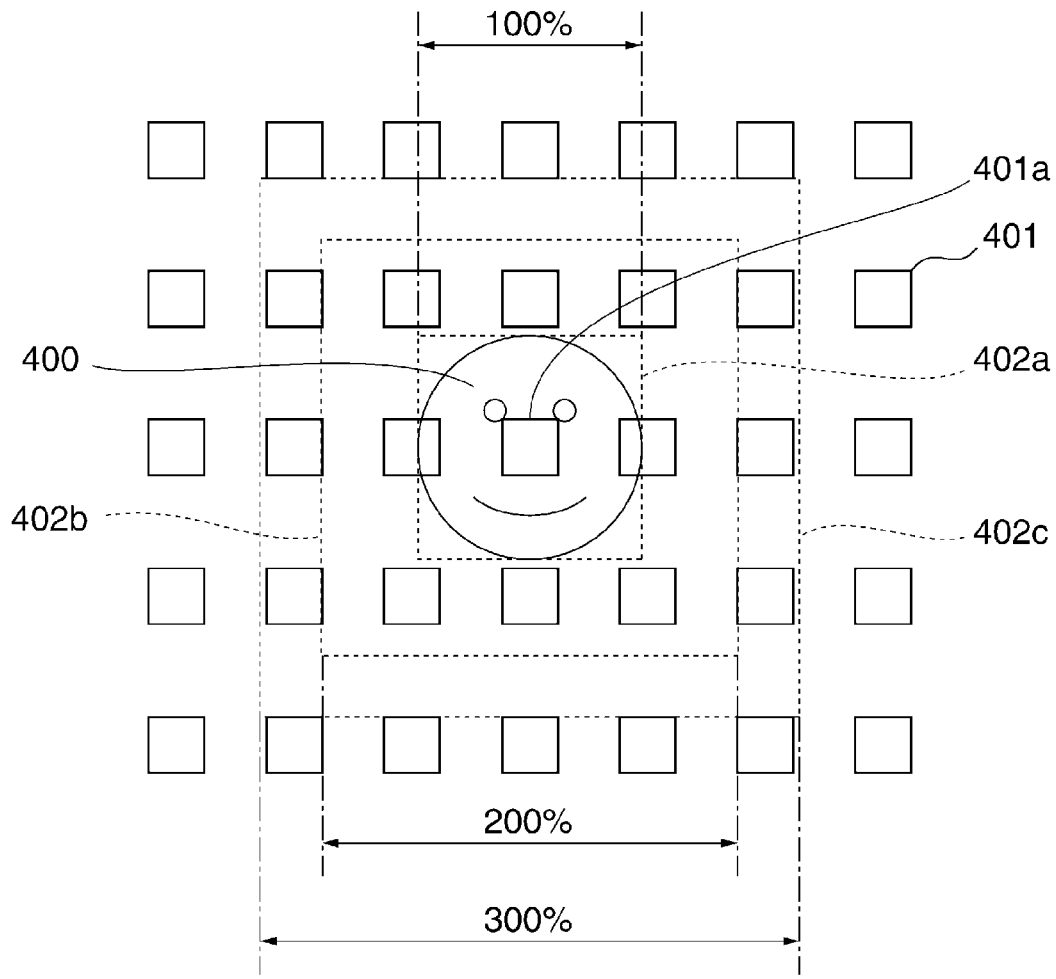
FIGS. 5A and 5B are diagrams useful in explaining setting of a face determination range according to the photographing modes shown in FIGS. 4A to 4E.

FIGS. 5A and 5B are diagrams useful in explaining setting of a face determination range according to the photographing modes shown in FIGS. 4A to 4E.

An outline of a face (i.e. a face area) is detected on an object image on the focusing plate 118 by the photometry section 121 (area sensor) described with reference to FIG. 2. Note that detection of the face area is performed by using a method described e.g. in Japanese Patent Laid-Open Publication No. 2007-24587.

In FIG. 5A, an object image 400 formed on the focusing plate 118, and sizes of the face determination areas 402a, 402b, and 402c (denoted by 402 when collectively referred to) are indicated. The transmission type liquid crystal 119 disposed adjacent to the focusing plate 118 displays respective display frames of a plurality of ranging points (hereinafter abbreviated to ranging points) 401 and the face determination area 402. When the line of sight is detected in the face determination area 402, the MPU 130 automatically selects a ranging point 401a at or close to the center of the face determination area 402, and lights and displays the ranging point 401a on the transmission type liquid crystal 119.

The MPU 130 sets the face determination area 402 according to the photographing speed setting (single photographing or continuous photographing) and the setting of ranging point priorities (sight line detection or face detection) with reference to a lateral width of the face area. In the example shown in FIGS. 5A and 5B, when the priority is given to sight line detection, the face determination area 402 is set to 100% and 150% for single photographing and continuous photographing, respectively, with reference to the lateral width of the face. On the other hand, when the priority is given to face detection, the face determination area 402 is set to 200% and 300% for single photographing and continuous photographing, respectively, with reference to the lateral width of the face.

According to the settings of the photographing modes shown in FIGS. 4A to 4E, the face determination area becomes different as shown in FIGS. 5A and 5B, depending on the priorities of the sight line detection and the face detection. This is for the following reason: there is no problem in a case where the positions of a ranging point selected according to face detection and a ranging point selected according to sight line detection completely coincide with each other. However, in a case where the positions of the two ranging points are displaced from each other, there arises a problem that it is impossible to determine which one of the ranging points is to be selected. Further, in a case where the ranging point is selected according to sight line detection, if there are a large number of ranging points and the ranging points are concentrated, erroneous detection can be caused. For this reason, the face determination area is set to a different size according to the priorities of sight line detection and face detection.

Further, the line of sight often moves so as to check the visual field, and hence the line of sight may be displaced from the face which the photographer desires to photograph. Therefore, to properly determine whether or not the photographer intentionally turns the line of sight away from the face, the face determination area is set to a different size according to the priorities of sight line detection and face detection.

For example, if the priority of face detection is higher than that of sight line detection, as shown in FIG. 5A, the face determination area is set to a wider area. Accordingly, since the face determination area is set to be larger compared with the case where the priority of sight line detection is higher, even in cases, for example, where the line of sight is displaced from the face, where an object is small, and where the face determination area is reduced due to turning-aside of an object, it is possible to continue to focus on the ranging point in the face of the object.

Further, as shown in FIG. 5B, when the photographing speed setting is for continuous photographing, the face determination range is set to be larger than that for single photographing. As a consequence, even when the line of sight is displaced from the face of the object during continuous photographing, since the face determination range is set to be larger, it is possible to increase the possibility of shifting the ranging point to the center of the face area.

Note that in the present embodiment, as for the face determination range set according to face detection and the ranging point selected according to sight line detection, if at least part of the display frame of a ranging point is included in the face determination range, the ranging point is determined through face detection, but a relationship between the face determination range set according to face detection and the ranging point selected according to sight line detection is not limited to this. Further, a range for object determination may be determined not by face detection, but by using object detection information, such as a color of an object, a feature point of e.g. eyes, and a shape of the object. Further, the face determination range set according to face detection may be hidden.

Figure 6:
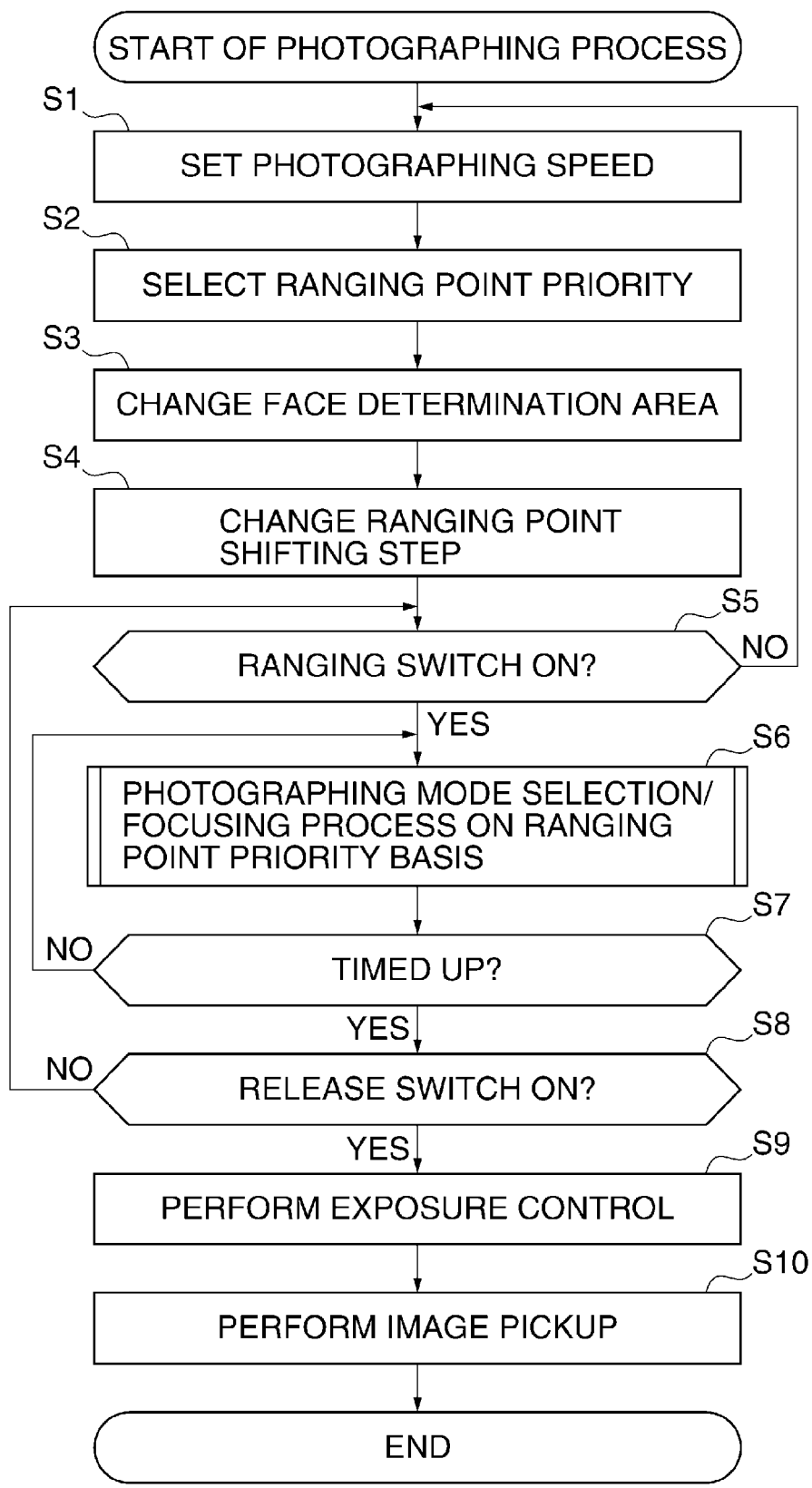
FIG. 6 is a flowchart of a photographing process performed by the camera shown in FIGS. 2 and 3.

FIG. 6 is a flowchart of a photographing process performed by the camera shown in FIGS. 2 and 3. The photographing process shown in FIG. 6 is executed under the control of the MPU 130.

First, the power of the camera is switched on, and the photographer sets the photographing speed (step S1). Then, the photographer selects one of the photographing modes shown in FIGS. 4A to 4E, i.e. the ranging point priorities (step S2). By this selection, the MPU 130 sets the face determination area as described with reference to FIGS. 5A and 5B (step S3). Then, the photographer sets the ranging point shifting step by the ranging point shifting step-changing section 134 (step S4).

Next, the MPU 130 determines whether or not the ranging switch 101 has been switched on (step S5). If the ranging switch 101 has not been switched on, i.e. if the ranging switch 101 is off (NO to the step S5), the MPU 130 returns to the step S1, and waits for the user to set the photographing speed. Note that if the above-mentioned settings are not changed from the values set in the camera in advance, they are not actually changed in the steps S1 to S4.

If it is determined that the ranging switch 101 has been switched on (YES to the step S5), the timer 135 starts counting time. Then, the MPU 130 executes a photographing mode selection/focusing process on a ranging point priority basis, details of which will be described hereinafter (step S6). Next, the MPU 130 determines whether or not the timer 135 has counted up (step S7). If the timer 135 has not counted up (NO to the step S7), the MPU 130 returns to the step S5, whereas if the timer 135 has counted up (YES to the step S7), the MPU 130 determines whether or not the release button 111 has been switched on (step S8).

If it is determined that the release button 111 has not been switched on (NO to the step S8), the MPU 130 returns to the step S5, whereas if it is determined that the release button 111 has been switched on (YES to the step S8), the MPU 130 controls the aperture and the shutter speed to thereby perform exposure control (step S9). Then, the MPU 130 causes the image pickup device 125 to perform photographing by exposure (step S10), followed by terminating the photographing process.

Although not shown, in a case where the photographing speed setting is for continuous photographing, the MPU 130 returns to the step S5 after execution of the step S10.

The predetermined time period counted by the above-mentioned timer 135 can be set as desired e.g. according to the setting of ranging point priorities. For example, in a case where an object is moving, if the object is followed for photographing while performing ranging by pressing the ranging start button 101, a repetition period of face detection and sight line detection is reduced by reducing the time period for which the timer 135 is set whereby the following performance is improved. More specifically, in a case where the MPU 130 detects panning of the camera, or in a case where the photographing speed setting is for continuous photographing, the time period for which the timer 135 is set is automatically reduced.

Further, if the photographing mode is set to the portrait mode or the photographing speed setting is for single photographing, the MPU 130 lengthens the repetition period of face detection and sight line detection by increasing the timer time period for the timer 135, whereby the ranging point is prevented from being incessantly shifted, from one point to another.

FIG. 7 is a table of ratios of time periods counted by the timer 135 (timer time periods), which are set according to the photographing mode and photographing speed setting. Note that in the table shown FIG. 7, there are shown ratios of time periods to a predetermined time period for which the timer 135 is set by default (i.e. standard time period).

Referring to FIG. 7, in a case where the photographing speed setting is for single photographing, the ratio becomes the largest when the photographing mode is the group photograph mode, and becomes the smallest when the photographing mode is the sport mode. Similarly, also in a case where the photographing speed setting is for continuous photographing, the ratio becomes the largest when the photographing mode is the group photograph mode, and becomes the smallest when the photographing mode is the sport mode. In general, the ratio for continuous photographing is made smaller than that for single photographing.

When a comparison is made between the portrait mode and the group photograph mode, and between the travel mode and the sport mode, in a case where the ranging point is determined according to both of face detection and sight line detection, the timer time period for the timer 135 is increased so as to cause the ranging point to be switched at longer time intervals. With this setting, it is made possible for the user to perform operation using the MC 102.

On the other hand, when a comparison is made between the portrait mode and the travel mode, and between the group photograph mode and the sport mode, for the photographing modes with the higher priority given to sight line detection, the timer time period for the timer 135 is reduced such that the ranging point can be changed at shorter time intervals from one point to another. Further, when the photographing speed setting for single photographing is changed to that for continuous photographing, the timer time period in each photographing mode is reduced as described hereinabove whereby the following performance is improved.

Note that the settings of the timer time periods associated with the photographing modes shown in FIG. 7 are given as ratios, only by way of example, and instead of the ratios, the settings of the timer time periods may be given in units of seconds, for example. Further, in continuous photographing, the timer time period may be set to a different time period according to frame speed setting.

Figure 8:
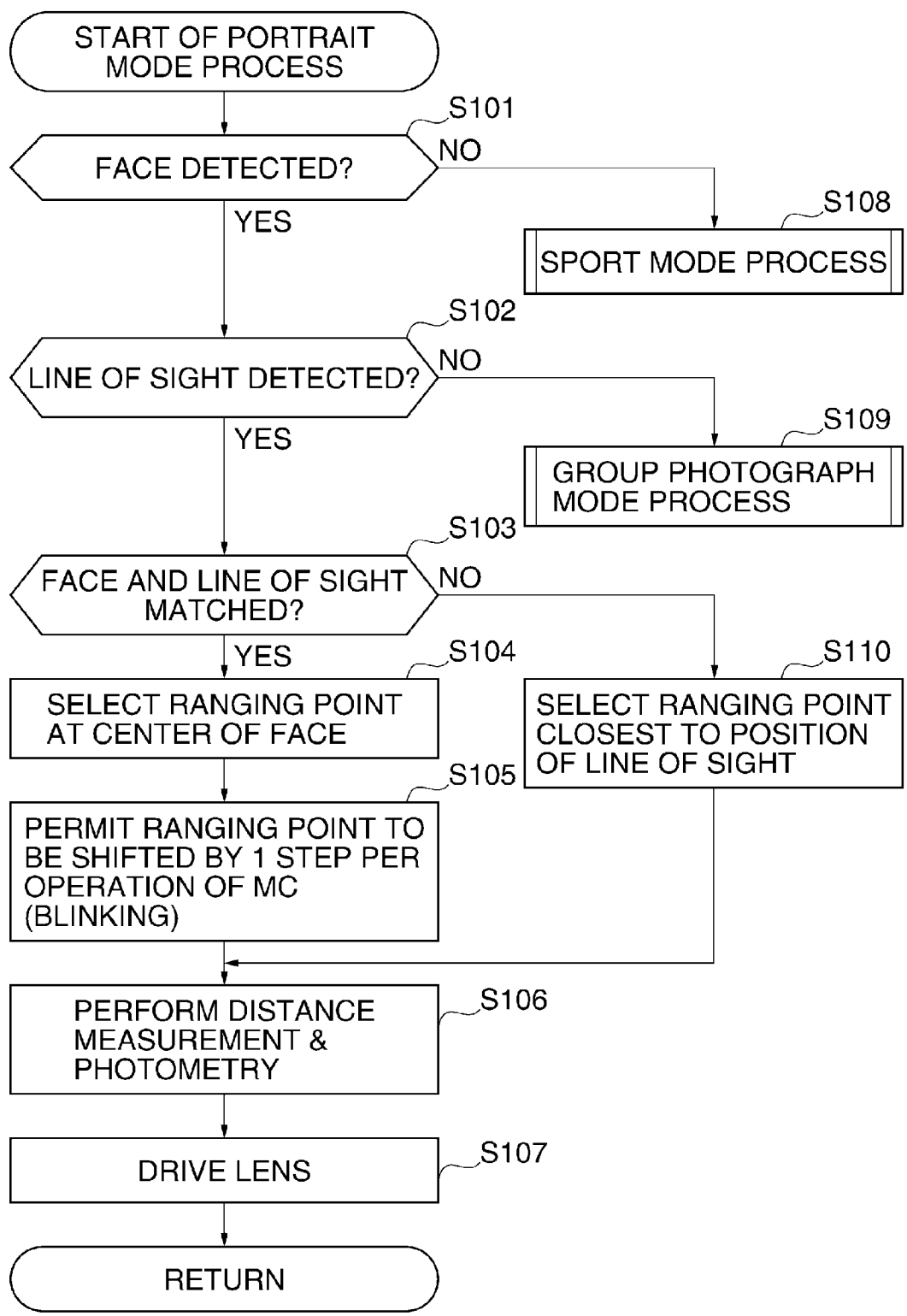
FIG. 8 is a flowchart of a portrait mode process executed in a step in the photographing process in FIG. 6, as a photographing mode selection/focusing process on a ranging point priority basis.

FIG. 8 is a flowchart of a portrait mode process executed in the step S6 in the photographing process in FIG. 6, as the photographing mode selection/focusing process on a ranging point priority basis.

In the portrait mode process shown in FIG. 8, it is assumed that the portrait mode is selected and set in the photographing mode setting. When the portrait mode process is started, the MPU 130 determines whether or not a face area is detected by the face detection section 132 (step S101). If a face area is detected (YES to the step S101), the MPU 130 determines whether or not the line of sight is detected by the sight line detection section 110 (step S102).

If the line of sight is detected (YES to the step S102), the MPU 130 determines whether or not the line of sight is detected in a face determination range (step S103). That is, the MPU 130 determines whether or not there is a match between the face and the line of sight. In this step, as described with reference to FIGS. 5A and 5B, since the priority is given to face detection, the MPU 130 determines whether or not the line of sight is detected within a rectangular range (face determination range) which contains the face and is expanded with respect to the width of the face, up to 200% thereof, in the case of a single photographing mode, and up to 300% thereof in the case of a continuous photographing mode. Note that the term "single photographing mode" refers to a mode for performing single photographing in which photographing is performed once by pressing the release button 111 once, and hence in this mode, the photographing speed setting is for single photographing. Further, the term "continuous photographing mode" refers to a mode for performing continuous photographing in which photographing is repeatedly performed by holding the release button 111 in a pressed state, and hence in this mode, the photographing speed setting is for continuous photographing.

When the line of sight is detected in the face determination range (YES to the step S103), the MPU 130 selects a ranging point at the center of the face (step S104). Then, when an instruction for shifting the ranging point is received from the MC 102, the MPU 130 sets the ranging point to a blinking state, and enables the ranging point to be shifted on one step-by-one step basis (step S105).

In this step, the timer 136 is set to a time period within which the ranging point is permitted to be shifted, whereby shifting of the ranging point by the MC 102 is permitted during the set time period. Note that the ranging point is caused to blink so as to notify the photographer that shift of the ranging point is permitted on a temporary basis, and any other method other than blinking may be employed insofar as it makes it possible to notify the photographer that the permission to shift the ranging point is temporary.

When the ranging point is finally determined, the MPU 130 performs distance measurement by the ranging section 123 and photometry by the photometry section 121 (step S106), and focuses the camera on the object by driving the focus lens according to the result of distance measurement (step S107). Then, the MPU 130 proceeds to the step S7 in FIG. 6.

If no face area is detected (NO to the step S101), the MPU 130 shifts to a sport mode process, described hereinafter (step S108). Further, if the line of sight is not detected (NO to the step S102), the MPU 130 shifts to a group photograph mode process, described hereinafter (step S109). If the line of sight is not detected in the face determination range (NO to the step S103), the MPU 130 selects a ranging point closest to the position of the line of sight (step S110), and proceeds to the step S106.

Figure 9A:
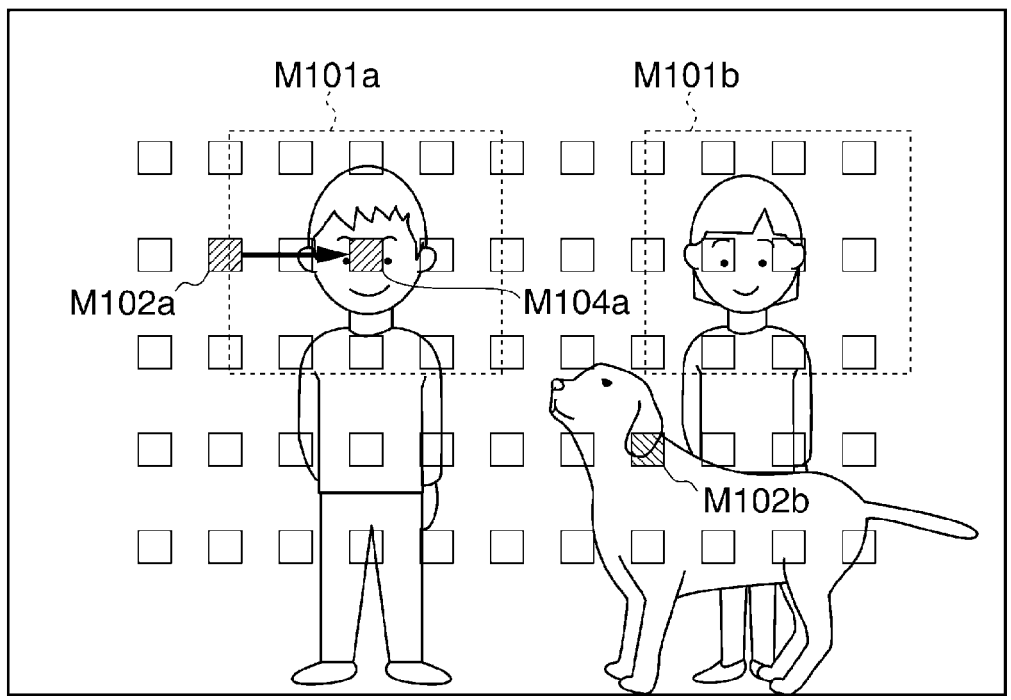
FIGS. 9A and 9B are diagrams of examples of shift of a selected ranging point, which are useful in explaining how the selected ranging point is shifted within the viewfinder in the portrait mode process in FIG. 8.
Figure 9B:
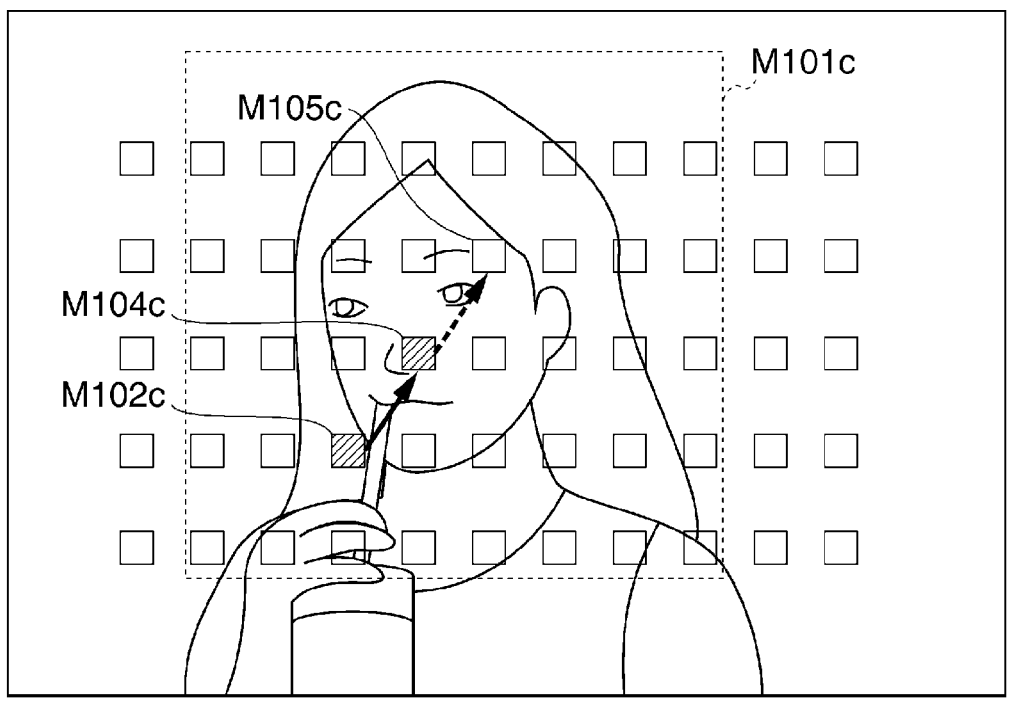

FIGS. 9A and 9B are diagrams of examples of shift of a selected ranging point, which are useful in explaining how the selected ranging point is shifted within the viewfinder in the portrait mode process in FIG. 8.

In the example shown in FIG. 9A, two face areas are detected in the imaging area, and face determination ranges M101a and M101b are set for the detected two face areas, respectively. Assuming that the closest ranging point based on sight line detection is a ranging point M102a, the ranging point M102a is included in the face determination range M101a, and hence the MPU 130 selects a ranging point M104a at or close to the center of the face as the ranging point.

On the other hand, assuming that the closest ranging point based on sight line detection is a ranging point M102b close to the face determination range M101b, the ranging point M102b is not included in the face determination range M101b, and hence the MPU 130 does not shift the ranging point, and selects the ranging point M102b (that is, the ranging point is not shifted from the ranging point M102b to a ranging point at or close to the center of the face).

As described above, by using sight line detection and face detection, it is possible to accurately measure the distance to the main object.

In the example shown in FIG. 9B, a large face area including a number of ranging points is detected in the imaging area, and a face determination range M101c is set. In this state, assuming that the closest ranging point based on sight line detection is a ranging point M102c, the ranging point M102c is included in the face determination range M101c, and hence the MPU 130 selects a ranging point M104c at or close to the center of the face. After that, when an instruction for shifting the ranging point in a right upward direction is given by operating the MC 102 once, the MPU 130 shifts the ranging point to a ranging point M105c adjacent to the ranging point M102c, and sets the ranging point M102c to a blinking state.

As described above, although when a number of ranging points are included in a face area, a ranging point at or close to the center of a face of a target object is selected according to face detection in combination with sight line detection, there is a case where a photographer desires to further shift the ranging point to a feature point, such as eyes, and hence the MPU 130 permits the ranging point to be shifted by the MC 102 only by one step (distance to an adjacent ranging point) per one operation of thereof.

Note that when a position indicated by the instruction input by the MC 102 is outside the face determination range, the MPU 130 inhibits shifting of the ranging point. That is, the ranging point priorities are set such that the priority is given to face detection, and hence when the position indicated by the instruction input by the MC 102 is outside the face determination range, the MPU 130 inhibits shifting of the ranging point. This means that the MPU 130 restricts the range of shift of the ranging point.

Further, in a case where a plurality of ranging points are included in the face determination range M101c, the MPU 130 increases the time period counted by the timer 136 in the step S105 in FIG. 8 to thereby secure a sufficient time period for the ranging point to be shifted by operating the MC 102. Further, the MPU 130 also increases the time period counted by the timer 135 in the step S7 in FIG. 6 to thereby cause the ranging point selected in the step S104 or S110 in FIG. 8 to be changed at longer time intervals. This makes it possible to measure a distance to the object over a longer time period.

Figure 10:
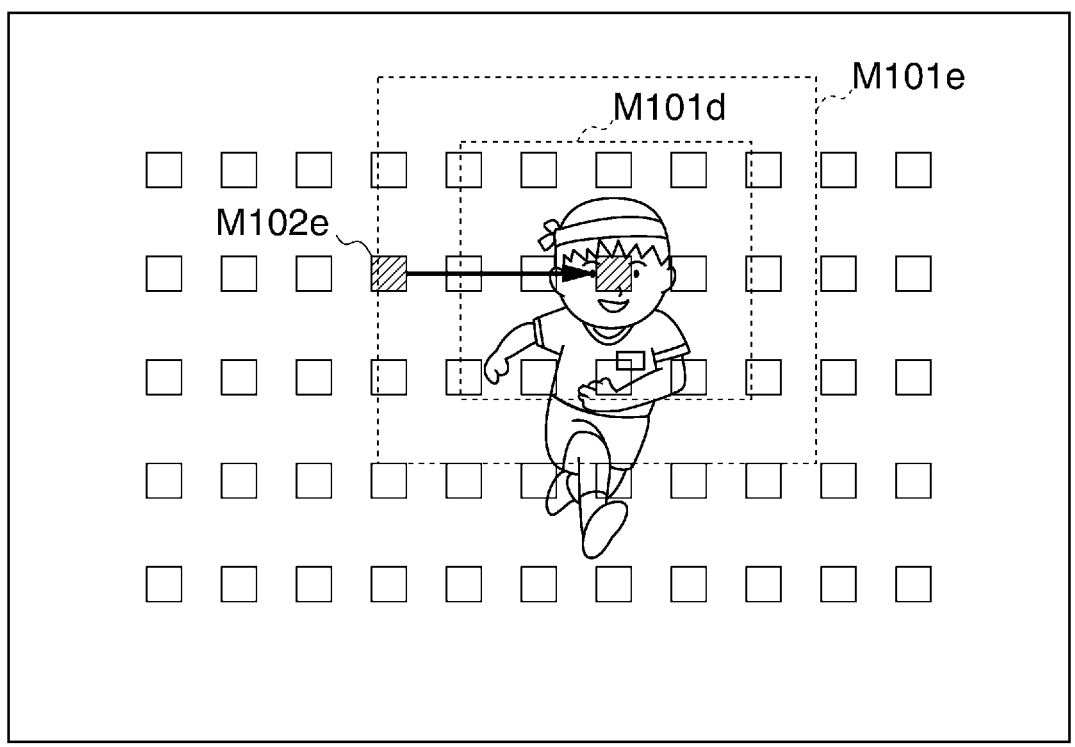
FIG. 10 is a diagram of another example of shift of the selected ranging point, which is useful in explaining how the selected ranging point is shifted within the viewfinder in the portrait mode process in FIG. 8.

FIG. 10 is a diagram of another example of shift of the selected ranging point, which is useful in explaining how the selected ranging point is shifted within the viewfinder in the portrait mode process in FIG. 8. Note that in FIG. 10, it is assumed that an object is moving, and the photographing speed setting is for continuous photographing.

In the example shown in FIG. 10, a face determination range M101d is set as the face determination range in the single photographing mode. On the other hand, since the face determination range is increased in the continuous photographing mode, a face determination range M101e is set.

With this setting, even in a case where the closest ranging point selected based on sight line detection is largely displaced from the object as indicated by a ranging point M102e, a ranging point at the center of the face is selected. This makes it possible to continuously cause the ranging point to match the moving object. Then, even in a case where the object is moving away to become smaller in image, or in a case where the object turns aside to reduce the face determination range, it is possible to accurately select a ranging point since the face determination range is increased by the setting.

However, e.g. in an athletic meet, in a case where a plurality of running persons are photographed in the continuous photographing mode, it becomes easy to track a specific person by sight line detection and face detection, but if the face determination range is increased too much, there arises a possibility that the ranging point is shifted to a person different from the target person. Therefore, the configuration may be such that the face determination range can be set as desired.

Further, in this case, the time period counted by the timer 136 in the step S105 in FIG. 8 is set to a shorter time period to thereby make the shifting of the ranging point by the MC 102 more restricted than in the single photographing mode, and the time period counted by the timer 135 in the step S7 in FIG. 6 is set to a shorter time period to thereby cause the ranging point determination based on face detection and sight line detection to be performed at shorter time intervals.

Figure 11:
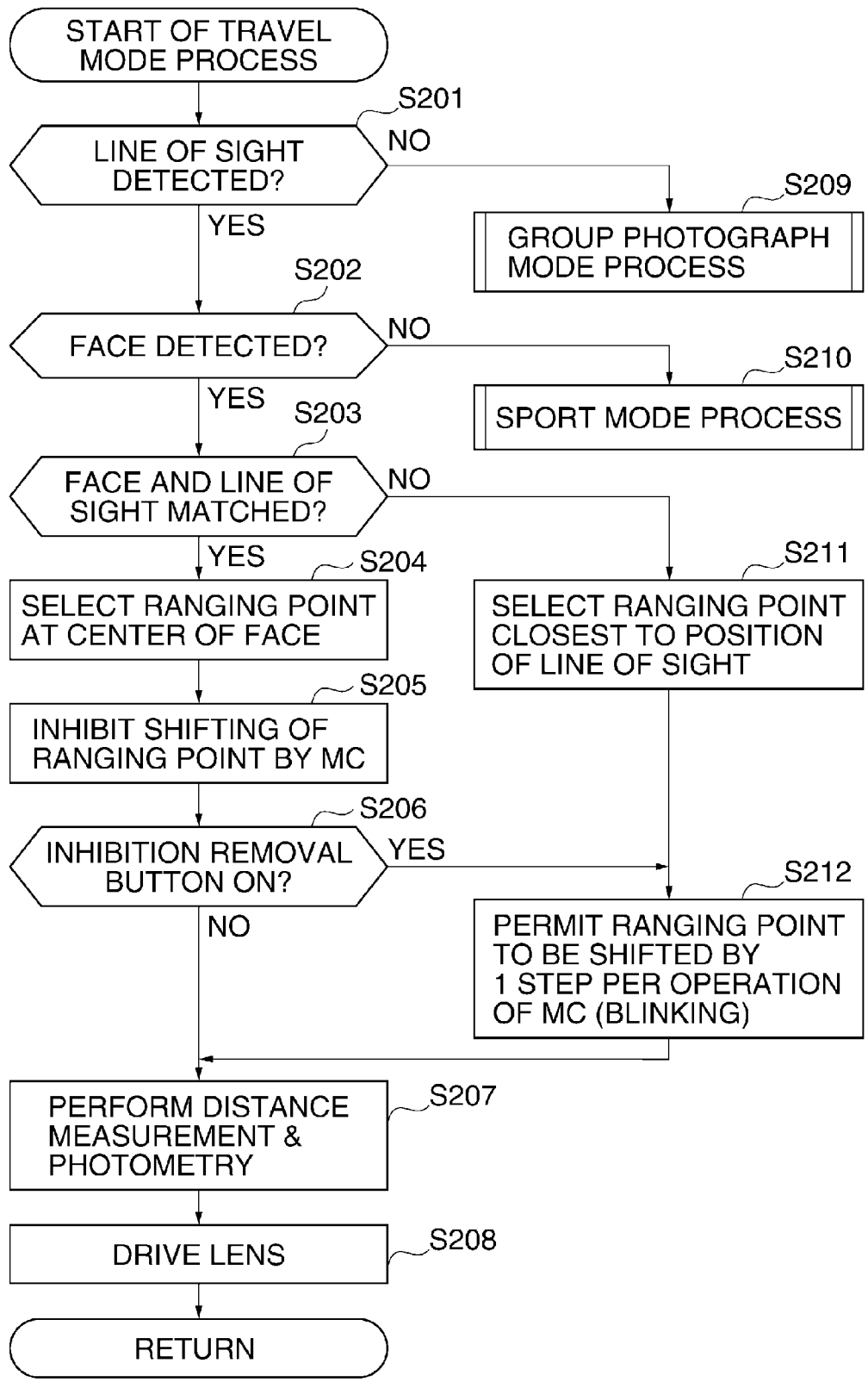
FIG. 11 is a flowchart of a travel mode process executed in the step in the photographing process in FIG. 6, as the photographing mode selection/focusing process on a ranging point priority basis.

FIG. 11 is a flowchart of a travel mode process executed in the step S6 in the photographing process in FIG. 6, as the photographing mode selection/focusing process on a ranging point priority basis.

Referring to FIG. 11, assuming that the travel mode is selected and set in the photographing mode setting, the travel mode process is started. First, the MPU 130 determines whether or not the line of sight is detected by the sight line detection section 110 (step S201). If the line of sight is detected by the sight line detection section 110 (YES to the step S201), the MPU 130 determines whether or not a face area is detected by the face detection section 132 (step S202).

When a face area is detected (YES to the step S202), the MPU 130 determines whether or not the line of sight is detected in the face determination range (step S203). In this step, as described with reference to FIGS. 5A and 5B, since the priority is given to face detection, the MPU 130 determines whether or not the line of sight is detected within a rectangular range (face determination range) which contains the face and is expanded with respect to the width of the face, up to 100% thereof in the case of the single photographing mode, and up to 150% thereof in the in the case of the continuous photographing mode.

When the line of sight is detected in the face determination range (YES to the step S203), the MPU 130 selects a ranging point at or close to the center of the face (step S204). Then, the MPU 130 inhibits shifting of the ranging point by the MC 102 (step S205).

In the travel mode, it is considered unnecessary to perform shifting of the ranging point by the MC 102, since a condition for determining a match between the face determination range and a position where the line of sight is detected is made more strict, and hence the MPU 130 inhibits shifting of the ranging point by the MC 102. With this, the MPU 130 prevents the ranging point from being carelessly shifted.

On the other hand, there is a case where the photographer desires to shift the ranging point by using the MC 102, and hence in this process, the MPU 130 determines whether or not an inhibition removal button is switched on (step S206). Note that the button 113c provided on the grip section 112 appearing in FIG. 2 functions as the inhibition removal button for removing inhibition of shifting of the ranging point by the MC 102.

When the inhibition removal button is not switched on, i.e. when the inhibition removal button is off (NO to the step S206), the MPU 130 performs distance measurement by the ranging section 123 and photometry by the photometry section 121 (step S207), and focuses the camera on the object by driving the focus lens according to the result of distance measurement (step S208). Then, the MPU 130 proceeds to the step S7 in FIG. 6.

If the line of sight is not detected (NO to the step S201), the MPU 130 shifts to the group photograph mode process, described hereinafter (step S209). Further, if no face area is detected (NO to the step S202), the MPU 130 shifts to the sport mode process, described hereinafter (step S210).

If the line of sight is not detected in the face determination range (NO to the step S203), the MPU 130 selects a ranging point closest to the position of the line of sight (step S211).

Then, when an instruction for shifting the ranging point is input by the MC 102 (i.e. by the user's operation), the MPU 130 sets the ranging point to a blinking state (i.e. a discernible state), and permits the ranging point to be shifted on one step-by-one step basis (step S212). After that, the MPU 130 proceeds to the step S207.

Note that when the inhibition removal button is switched on (YES to the step S206), the MPU 130 proceeds to the step S212.

Figure 12A:
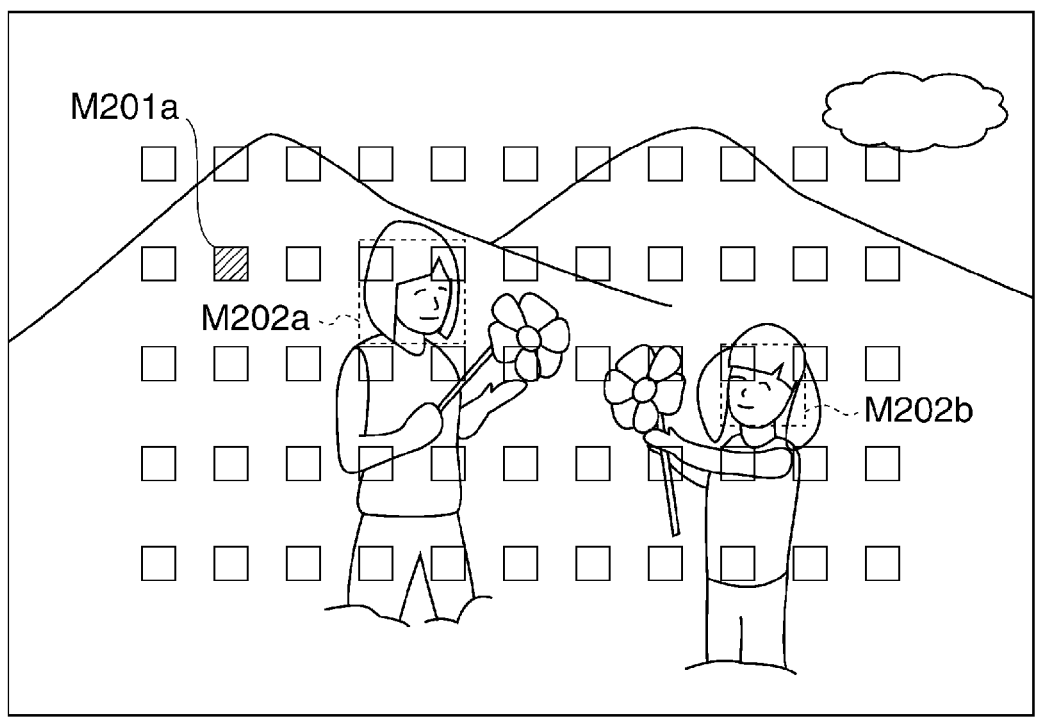
FIGS. 12A and 12B are diagrams of examples of shift of the selected ranging point, which are useful in explaining how the selected ranging point is shifted within the viewfinder in the travel mode process in FIG. 11.
Figure 12B:
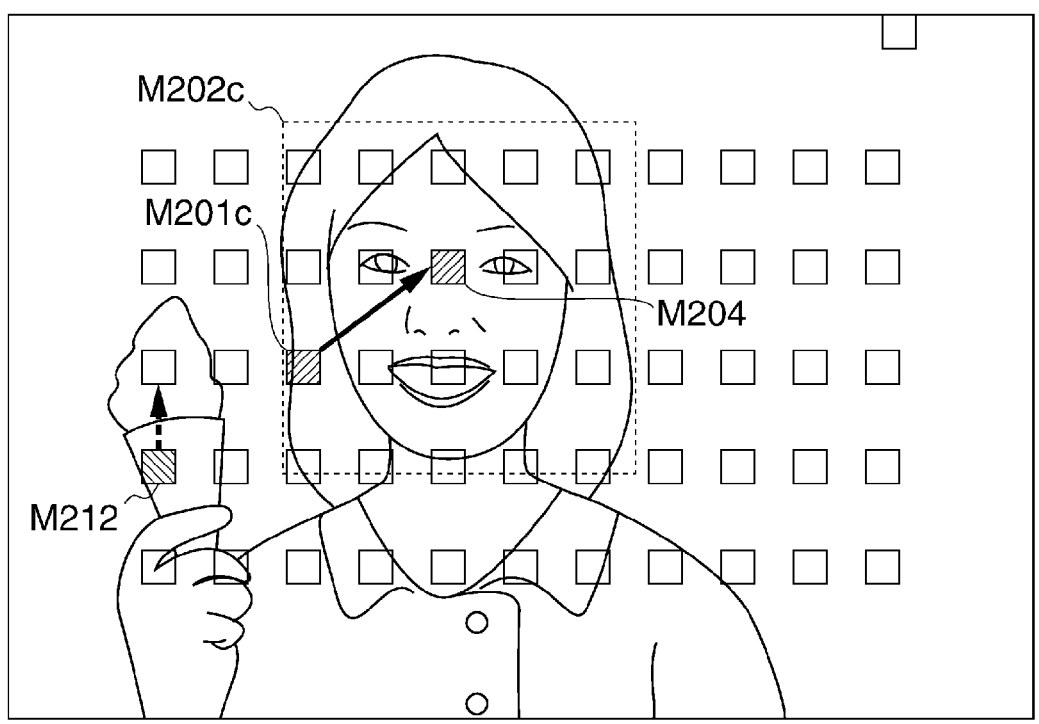

FIGS. 12A and 12B are diagrams of examples of shift of the selected ranging point, which are useful in explaining how the selected ranging point is shifted within the viewfinder in the travel mode process in FIG. 11.

In the example shown in FIG. 12A, two face areas are detected, and face determination ranges M202*a* and M202*b* are set for the two face areas, respectively. In this example, assuming that a ranging point selected based on sight line detection is a ranging point M201*a*, the ranging point M201*a* is included in neither of the face determination ranges M202*a* and M202*b*, and hence the MPU 130 does not shift the ranging point from the ranging point M201*a*.

In the example shown in FIG. 12B, a large face area including a plurality of ranging points is detected, and a face determination range M202*c* is set. In this example, assuming that a ranging point selected based on sight line detection is a ranging point M201*c*, the ranging point M201*c* is included in the face determination range M202*c*, and hence the MPU 130 selects a ranging point M204 at or close to the center of the face.

On the other hand, in a case where the closest ranging point selected based on sight line detection is a ranging point M212, the ranging point M212 is not included in the face determination range M202*c*, and hence the MPU 130 does not shift the ranging point from the ranging point M212, but when shifting of the ranging point by the MC 102 is permitted, the MPU 130 sets the shifted ranging point to a blinking state.

As described above, when the travel mode is selected, the face determination range is reduced to thereby prevent the ranging point from being easily shifted to the face area. This makes it possible to focus the camera on a person when there is a match between a specific person or family and the line of sight with a high exactitude, while determining an object other than the person, such as a scenery, by the line of sight.

Figure 13:
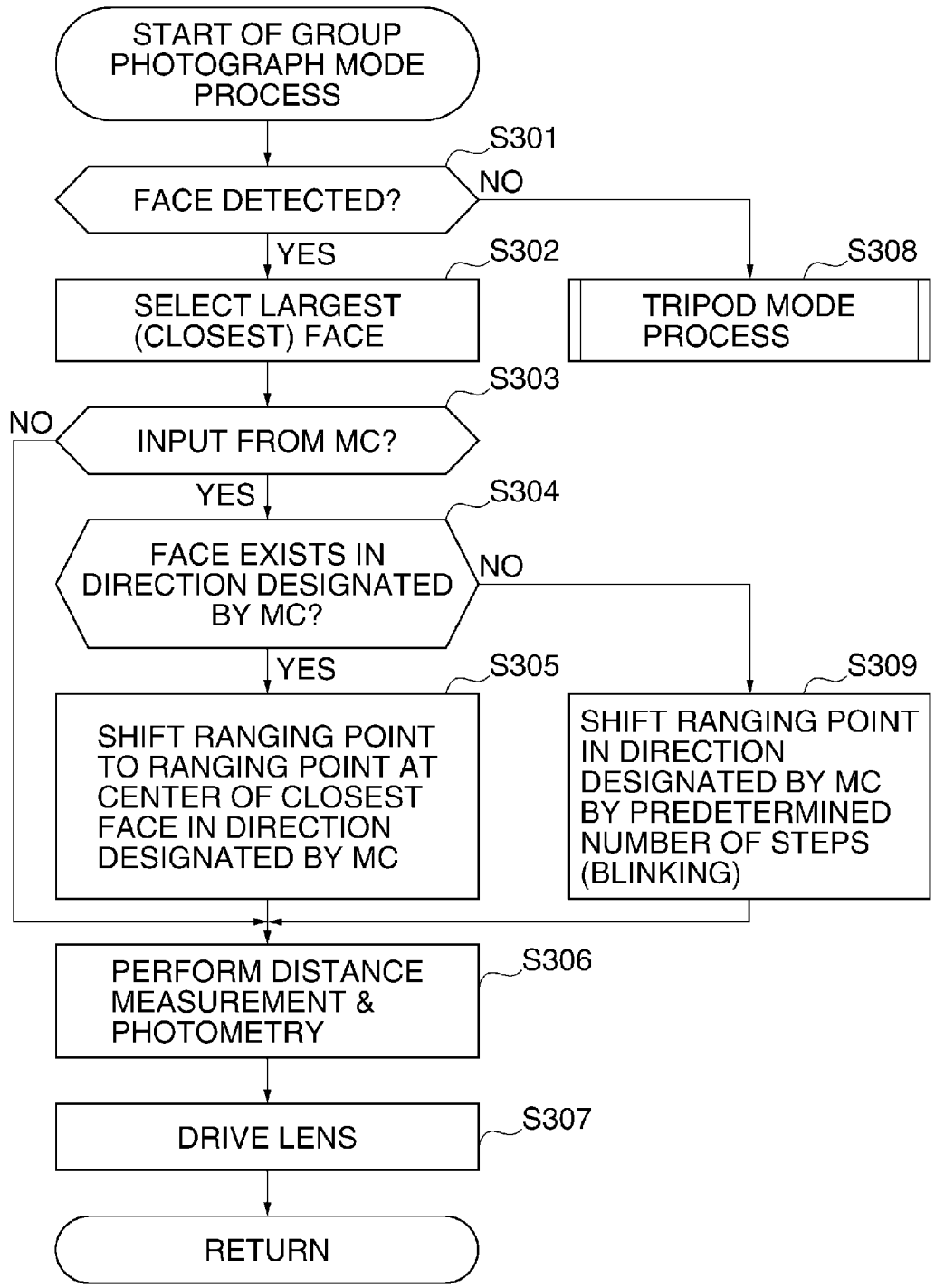
FIG. 13 is a flowchart of a group photograph mode process executed in the step in the photographing process in FIG. 6, as the photographing mode selection/focusing process on a ranging point priority basis.

FIG. 13 is a flowchart of the group photograph mode process executed in the step in the photographing process in FIG. 6, as the photographing mode selection/focusing process on a ranging point priority basis.

Referring to FIG. 13, it is assumed that the group photograph mode is selected and set in the photographing mode setting. The setting of this group photograph mode includes shifting to the group photograph mode process according to determination in the step S102 of the portrait mode process in FIG. 8 or determination in the step 201 of the travel mode process in FIG. 11. When the group photograph mode process is started, first, the MPU 130 determines whether or not a face area is detected by the face detection section 132 (step S301). If a face area is detected by the face detection section 132 (YES to the step S301), the MPU 130 selects the largest face area of the detected face areas (i.e. face determination ranges) (step S302).

Here, selection of the largest face area is not limitative, but a face area at a closest location or a face area at the center of the whole image may be selected.

Then, the MPU 130 determines whether or not an instruction for shifting the ranging point has been input by photographer's operation of the MC 102 (step S303). If an instruction for shifting the ranging point has been input by photographer's operation of the MC 102 (YES to the step S303), the MPU 130 determines whether or not any face area(s) exist(s) in a direction in which the ranging point is to be shifted by the photographer's operation of the MC 102 (also referred to as the changing direction) (step S304).

If any face area(s) exist(s) in the direction of shifting the ranging point (YES to the step S304), the MPU 130 shifts the ranging point to the center of a face closest to the ranging point selected before the shift in the shifting direction (step S305). Then, the MPU 130 performs distance measurement by the ranging section 123 and photometry by the photometry section 121 (step S306), and focuses the camera on the object by driving the focus lens according to the result of distance measurement (step S307). Then, the MPU 130 proceeds to the step S7 in FIG. 6.

If no face area is detected by the face detection section 132 (NO to the step S301), the MPU 130 shifts to a tripod mode process, described hereinafter (step S308). Further, if the instruction for shifting the ranging point has not been input by photographer's operation of the MC 102 (NO to the step S303), the MPU 130 directly proceeds to the step S306.

If there is no face area in the direction of shifting the ranging point (NO to the step S304), the MPU 130 shifts the ranging point in the shifting direction designated by the photographer's operation of the MC 102 by a shifting step amount set in advance (step S309). At this time, the MPU 130 sets the ranging point to a blinking state to thereby notify the photographer that no face area is detected, and the ranging point has been shifted. After that, the MPU 130 proceeds to the step S306.

Note that the time period for permitting the ranging point to be shifted is set by the timer 136, and the ranging point can be shifted by the MC 102 within the time period for which the timer 136 is set.

Figure 14:
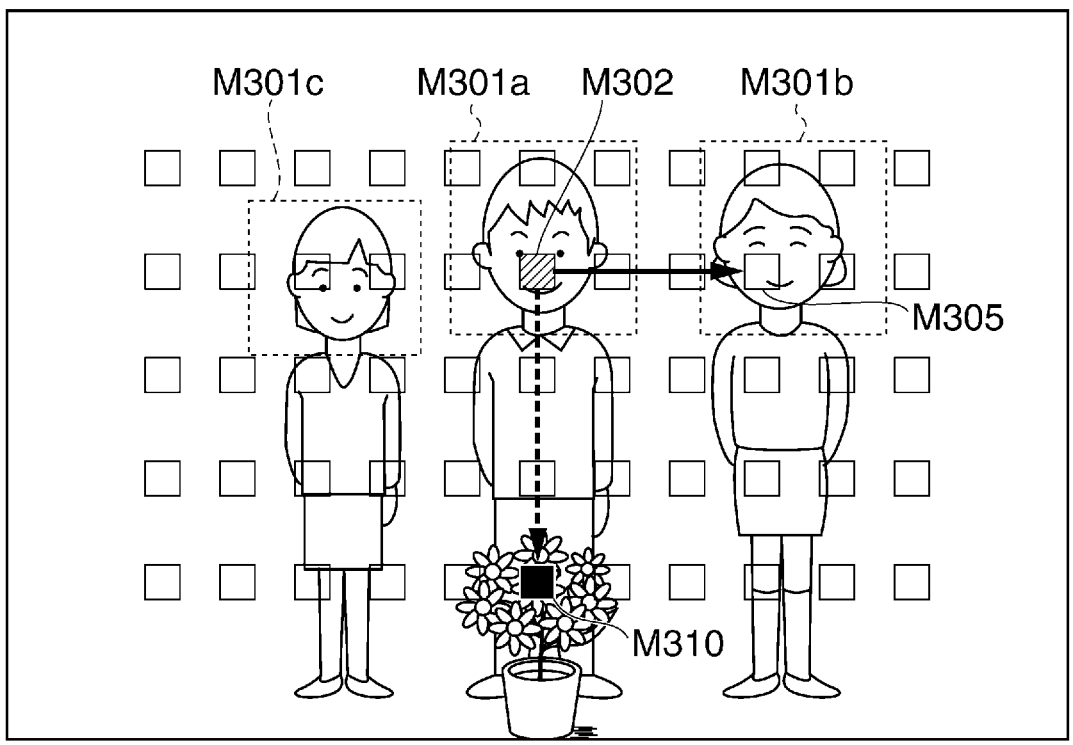
FIG. 14 is a diagram of an example of shift of the selected ranging point, which is useful in explaining how the selected ranging point is shifted within the viewfinder in the group photograph mode process in FIG. 13.

FIG. 14 is a diagram of an example of shift of the selected ranging point, which is useful in explaining how the selected ranging point is shifted within the viewfinder in the group photograph mode process in FIG. 13.

In the example shown in FIG. 14, three face areas are detected, and face determination ranges M301*a*, M301*b*, and M301*c* are set for the detected three face areas, respectively. In this example, the face determination range M301*a* is the largest face determination range, and hence the MPU 130 selects a ranging point M302 at the center of the face determination range M301*a* as the ranging point.

After that, in a case where an instruction for shifting the ranging point in a right direction is input by photographer's operation of the MC 102, the MPU 130 selects a raging point M305 because the closest face determination range in the shifting direction is the face determination range M301*b*. Further, when an instruction for shifting the ranging point in a downward direction is input by photographer's operation of the MC 102, there is no face detection range in the direction indicated by the instruction from the MC 102, and hence the MPU 130 shifts the ranging point to a ranging point M310 by a shifting step amount set in advance (e.g. three steps), and sets the ranging point M310 to a blinking state.

As described above, when the group photograph mode is selected, the face determination range can be selected according to the operation of the MC 102, which makes it easy to select the face determination range in a case where a large number of persons are photographed, or a case where a specific person is photographed in the crowd.

Figure 15:
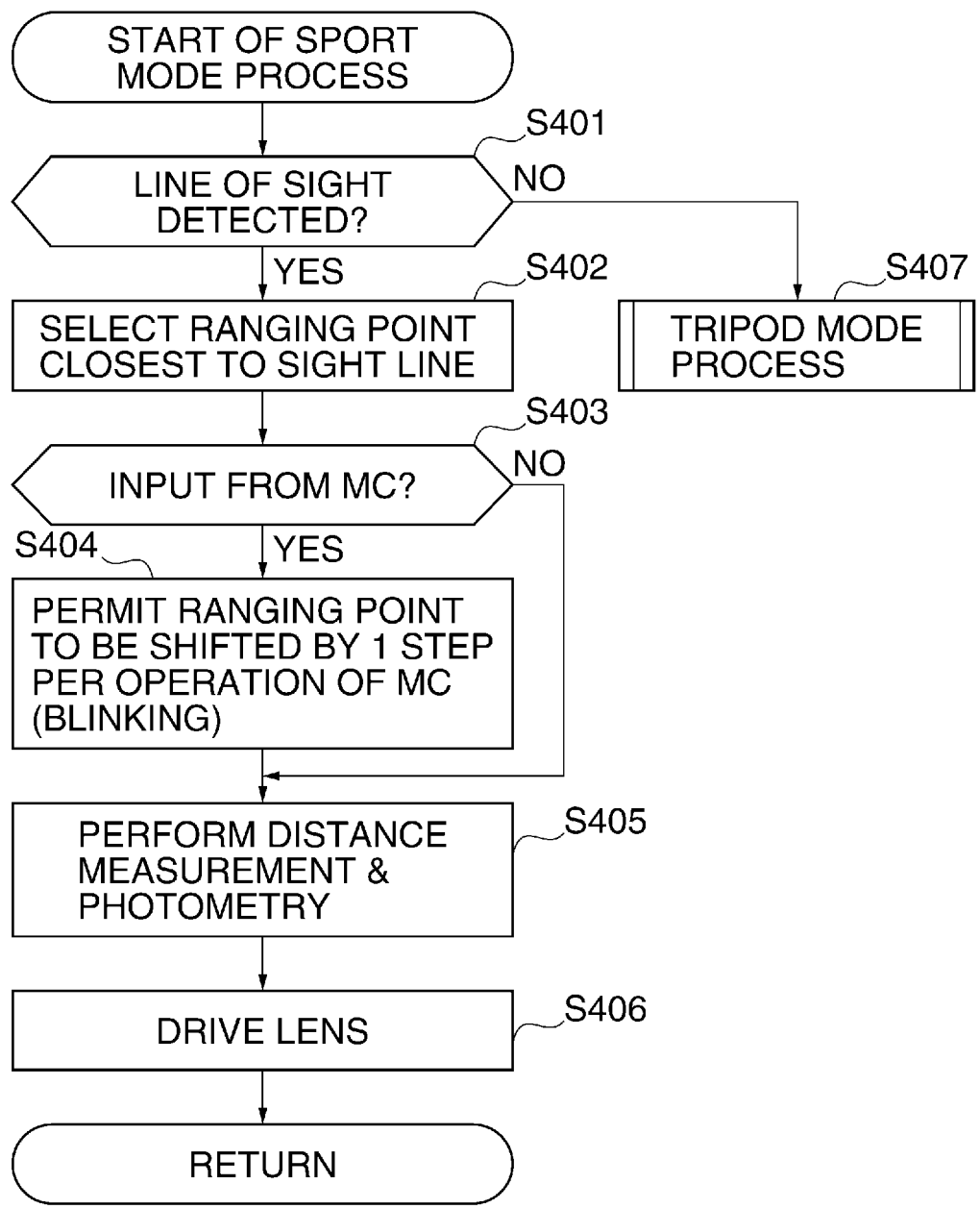
FIG. 15 is a flowchart of a sport mode process executed in the step in the photographing process in FIG. 6, as the photographing mode selection/focusing process on a ranging point priority basis.

FIG. 15 is a flowchart of the sport mode process executed in the step S6 in the photographing process in FIG. 6, as the photographing mode selection/focusing process on a ranging point priority basis.

Referring to FIG. 15, it is assumed that the sport mode is selected and set in the photographing mode setting. The setting of this sport mode includes shifting to the sport mode process according to determination in the step S101 of the portrait mode process in FIG. 8 or determination in the step 202 of the travel mode process in FIG. 11. When the sport mode is started, first, the MPU 130 determines whether or not the line of sight is detected by the sight line detection section 110 (step S401). If the line of sight is detected by the sight line detection section 110 (YES to the step S401), the MPU 130 selects a ranging point closest to the position of the line of sight (step S402).

Then, the MPU 130 determines whether or not an instruction for shifting the ranging point has been input by photographer's operation of the MC 102 (step S403). If an instruction for shifting the ranging point has been input by photographer's operation of the MC 102 (YES to the step S403), the MPU 130 permits the ranging point to be shifted over one step (distance to an adjacent ranging point) per one operation of the MC 102 (step S404).

In the step S404, the MPU 130 sets the ranging point to a blinking state to thereby notify the photographer that the ranging point has been shifted to a position different from a position where the line of sight is detected. At this time, the time period within which the ranging point is permitted to be shifted is set by the timer 136, and the ranging point can be shifted by operating the MC 102 within the time period for which the timer 136 is set. Note that the time period for permitting the ranging point to be shifted is set to the shortest time, compared with the other photographing modes.

After that, the MPU 130 performs distance measurement by the ranging section 123 and photometry by the photometry section 121 (step S405), and focuses the camera on the object by driving the focus lens according to the result of distance measurement (step S406). Then, the MPU 130 proceeds to the step S7 in FIG. 6.

If the line of sight is not detected by the sight line detection section 110 (NO to the step S401), the MPU 130 shifts to the tripod mode process, described hereinafter (step S407). Further, if an instruction for shifting the ranging point has not been input by photographer's operation of the MC 102 (NO to the step S403), the MPU 130 proceeds to the step S405.

Figure 16:
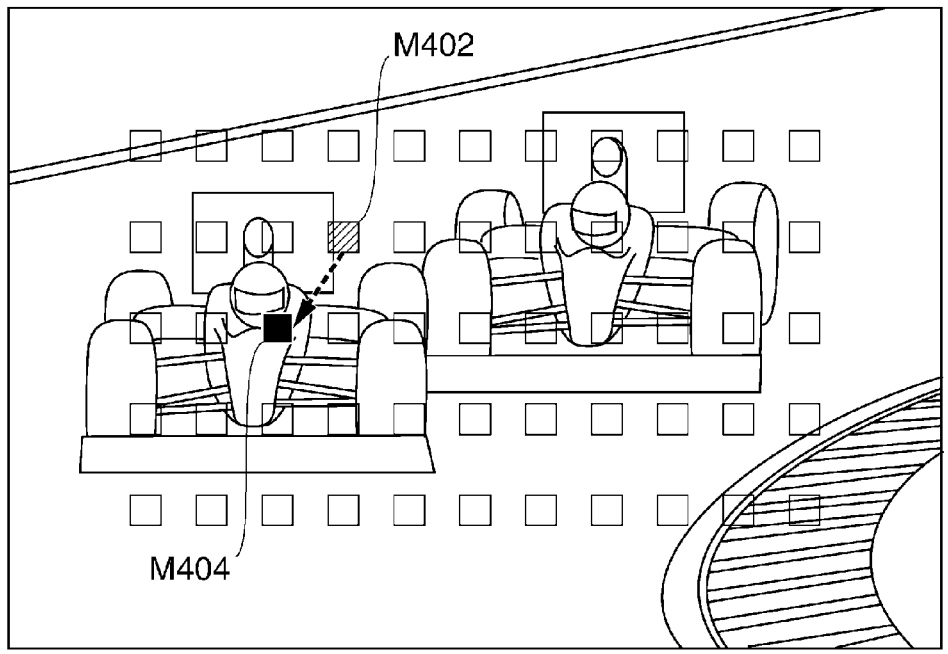
FIG. 16 is a diagram of an example of shift of the selected ranging point, which is useful in explaining how the selected ranging point is shifted within the viewfinder in the sport mode process in FIG. 15.

FIG. 16 is a diagram of an example of shift of the selected ranging point, which is useful in explaining how the selected ranging point is shifted within the viewfinder in the sport mode process in FIG. 15.

In the example shown in FIG. 16, a ranging point M402 is selected according to sight line detection. In this state, when an instruction for shifting the ranging point in a lower left direction is input by photographer's operation of the MC 102, the MPU 130 shifts the ranging point from the ranging point M402 to a ranging point M404, and sets the ranging point M404 to a blinking state.

As described above, when the sport mode is selected, ranging point selection based on detection of a face or a specific object is not permitted, and further, the timer time period, which is set on a photographing mode basis and counted by the timer 136, is set to the shortest time period. This makes it possible to quickly shift the ranging point according to sight line detection and operation of the MC 102, and for example, photographing in the sport mode is suitable for a case where an object moving at high speed is photographed, such as a car race, a railway scene, a soccer game, or a track-and-field sport.

Figure 17:
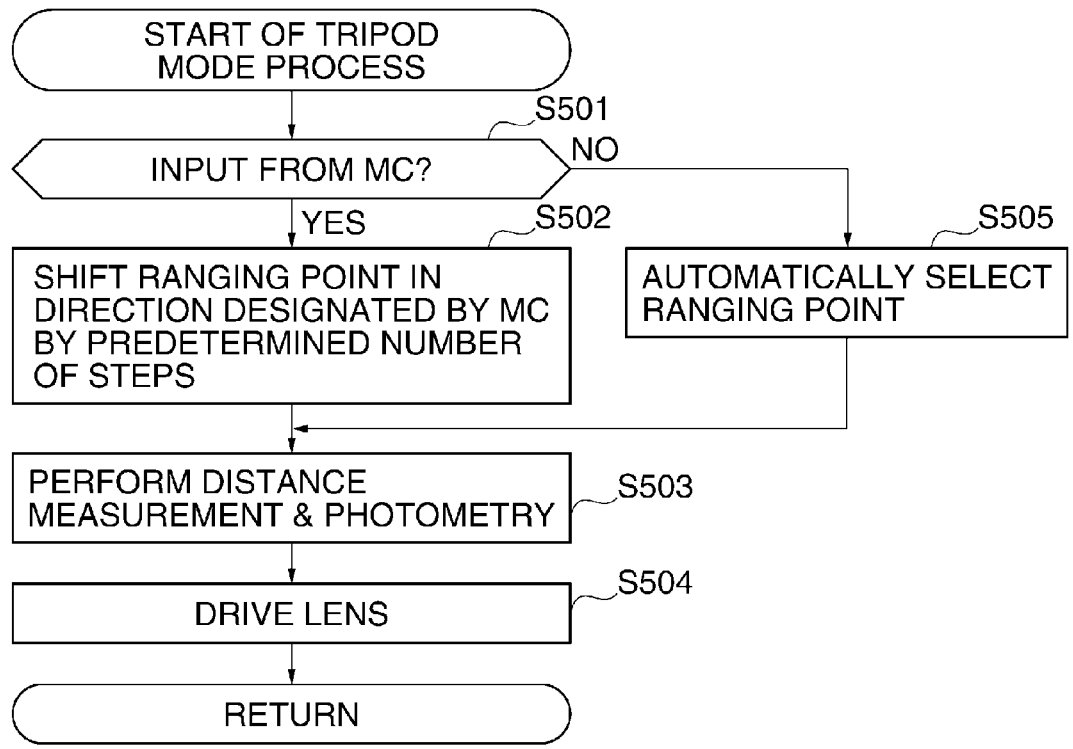
FIG. 17 is a flowchart of a tripod mode process executed in the step in the photographing process in FIG. 6, as the photographing mode selection/focusing process on a ranging point priority basis.

FIG. 17 is a flowchart of the tripod mode process executed in the step in the photographing process in FIG. 6, as the photographing mode selection/focusing process on a ranging point priority basis.

In the tripod mode process in FIG. 17, it is assumed that the tripod mode is selected and set in the photographing mode setting. The setting of this tripod mode includes shifting to the tripod mode process according to determination in the step S301 of the group photograph mode process in FIG. 13 or determination in the step 401 of the sport mode process in FIG. 15. When the tripod mode is started, first, the MPU 130 determines whether or not an instruction for shifting the ranging point has been input by photographer's operation of the MC 102 (step S501). If an instruction for shifting the ranging point has been input by photographer's operation of the MC 102 (YES to the step S501), the MPU 130 shifts the ranging point in a shifting direction designated by the photographer's operation of the MC 102 by a step amount set in advance (step S502). At this time, the MPU 130 sets the ranging point to a blinking state to thereby notify the photographer that no face area is detected, and the ranging point has been shifted.

After that, the MPU 130 performs distance measurement by the ranging section 123 and photometry by the photometry section 121 (step S503), and focuses the camera on the object by driving the focus lens according to the result of distance measurement (step S504). Then, the MPU 130 proceeds to the step S7 in FIG. 6.

If an instruction for shifting the ranging point has not been input by photographer's operation of the MC 102 (NO to the step S501), the MPU 130 sets automatic selection of a ranging point (step S505). At this time, the MPU 130 determines a ranging point according to an algorithm set in advance. For example, the MPU 130 selects the closest object which can be brought into focus or adjusts the focus to the infinity. Then, the MPU 130 proceeds to the step S503.

As described above, when the tripod mode is selected, shifting of the ranging point based on face detection and sight line detection is not permitted, but the ranging point is permitted to be shifted by a desired number of steps by photographer's operation of the MC 102. As a consequence, photographing in the tripod mode becomes suitable e.g. for a case where a landscape is photographed by fixing the camera to a tripod.

Although in the above-described embodiment, the description has been given of the single lens reflex camera, such as a digital camera, as an example of the optical device, the present invention can be similarly applied to any other electronic device, insofar as it is equipped with a camera function.

Although in FIGS. 13 and 17, the description has been given of the example in which the ranging point is shifted by operating the MC 102 by a desired number of steps, if there is no ranging point to which the ranging point can be shifted, in a shifting direction designated by photographer's operation of the MC 102, the ranging point is shifted to an end point of the screen.

Further, although in the present embodiment, the description has been given of the lens-interchangeable single-lens reflex camera, by way of example, the present embodiment can be similarly applied to a camera including a photographic lens arranged integrally with the camera body.

Further, although in the present embodiment, the description has been given of the camera including the optical viewfinder using the pentaprism and forth, by way of example, the present embodiment can be similarly applied, for example, to a camera having a sight line input device mounted on an EVF device.

In addition, although in the present embodiment, the description has been given of focus detection based on a phase difference method and object detection using a photometry device, by way of example, the present embodiment can be similarly applied to a camera that performs focus detection and object detection using an output from the image pickup device.

As is apparent from the above description, in the example shown in FIGS. 1A, 1B, and 2, the face detection section 132 and the MPU 130 function as a first detection unit, and the sight line detection section 110 and the MPU 130 function as a second detection unit. Further, the menu button 106 and the MPU 130 function as a mode selection unit, and the MPU 130 functions as a priority determination unit and a ranging point determination unit.

Further, the face determination area-changing section 133 and the MPU 130 function as a changing unit, and the photographing speed-setting section 131 and the MPU 130 function as a setting unit. Further, the ranging point selection section 102 and the MPU 130 function as a ranging point selection unit, and the MPU 130 functions as a restriction unit. In addition, the MPU 130 functions as a display control unit and a control unit.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-151477, filed Jul. 22, 2013, and No. 2013-151478, filed Jul. 22, 2013, which are hereby incorporated by reference herein in their entirety.

What is claimed is:

1. An optical device that has a plurality of focus detection points in a predetermined imaging area, and performs focus detection at a focus detection point which is selected from the plurality of focus detection points, comprising:

a first detection unit configured to detect a predetermined area from an object image in the predetermined imaging area;

a second detection unit configured to detect a position of a line of sight of a user in the predetermined imaging area;

a mode selection unit configured to select a photographing mode from a plurality of photographing modes;

a priority determination unit configured to determine priorities of said first detection unit and said second detection unit according to the photographing mode selected by said mode selection unit; and a focus detection point determination unit configured to determine a focus detection point at which the focus detection is to be performed, according to the priorities determined by said priority determination unit, wherein the priority determination unit is configured to determine the priorities of said first detection unit and said second detection unit according to the photographing mode selected by said mode selection unit such that said first detection unit has a higher priority than said second detection unit in a first photographing mode and said second detection unit has a higher priority than said first detection unit in a second photographing mode different from said first photographing mode.

2. The optical device according to claim 1, wherein when the position of the line of sight detected by said second detection unit is included in a first area which is determined to be the predetermined area by said first detection unit, said focus detection point determination unit determines a focus detection point which is located at or close to a center of the first area as the focus detection point at which the focus detection is to be performed.

3. The optical device according to claim 2, further comprising a changing unit configured to change the first area according to the priorities determined by said priority determination unit, and wherein when a priority of said second detection unit is higher than a priority of said first detection unit, said changing unit changes the first area such that the first area becomes smaller than a predetermined size.

4. The optical device according to claim 3, further comprising a setting unit configured to set one of a single photographing mode and a continuous photographing mode, and wherein when the continuous photographing mode is set, said changing unit changes the first area such that the first area becomes larger than the predetermined size.

5. The optical device according to claim 2, further comprising a focus detection point selection unit configured to select the focus detection point at which the focus detection is to be performed, by a user's operation; and a restriction unit configured to restrict, in a case where a plurality of focus detection points exist in the first area, the focus detection points selectable by said focus detection point selection unit to the focus detection points in the first area.

6. The optical device according to claim 5, further comprising a display control unit configured to display, when changing the focus detection point, the focus detection point in such a manner that the focus detection point is discernible to the user.

7. The optical device according to claim 1, wherein the predetermined area is a face area.

8. The optical device according to claim 1, further comprising a focus detection point selection unit configured to select the focus detection point at which the focus detection is to be performed, by a user's operation, and wherein said priority determination unit determines the priorities of said first detection unit, said second detection unit, and said focus detection point selection unit, according to the photographing mode selected by said mode selection unit.

9. The optical device according to claim 1, wherein said mode selection unit changes the photographing mode according to whether or not a result of detection by said first detection unit or said second detection unit is obtained.

10. The optical device according to claim 9, wherein in a case where the predetermined area is not detected by said first detection unit in a first photographing mode of the plurality of photographing modes, said mode selection unit shifts to a second photographing mode, in which a focus detection point is determined without using a result of detection by said first detection unit, of the plurality of photographing modes.

11. The optical device according to claim 10, wherein in a case where the position of the line of sight is not detected by said second detection unit in the first photographing mode, said mode selection unit shifts to a third photographing mode, in which a focus detection point is determined without using a result of detection by said second detection unit, of the plurality of photographing modes.

12. A method of controlling an optical device that has a plurality of focus detection points in a predetermined imaging area, and performs focus detection at a focus detection point which is selected from the plurality of focus detection points, comprising:

detecting a predetermined area from an object image in the predetermined imaging area;

detecting a position of a line of sight of a user in the predetermined imaging area;

selecting a photographing mode from a plurality of photographing modes;

determining priorities of detection of the predetermined area and detection of the position of the line of sight, according to the photographing mode selected by said selecting; and determining a focus detection point at which the focus detection is to be performed, according to the priorities determined by said determining, wherein the priorities of detection of the predetermined area and detection of the position of the line of sight are determined such that said detection of the predetermined area has a higher priority than said detection of the position of the line of sight in a first photographing mode and said detection of the position of the line of sight has a higher priority than said detection of the predetermined area in a second photographing mode different from said first photographing mode.

13. A non-transitory computer-readable storage medium storing a computer-executable control program for causing a computer to execute a method of controlling an optical device that has a plurality of focus detection points in a predetermined imaging area, and performs focus detection at a focus detection point which is selected from the plurality of focus detection points, wherein the method comprises:

detecting a predetermined area from an object image in the predetermined imaging area;

detecting a position of a line of sight of an user in the predetermined imaging area;

selecting a photographing mode from a plurality of photographing modes;

determining priorities of detection of the predetermined area and detection of the position of the line of sight, according to the photographing mode selected by said selecting; and determining a focus detection point at which the focus detection is to be performed, according to the priorities determined by said determining, wherein the priorities of detection of the predetermined area and detection of the position of the line of sight are determined such that said detection of the predetermined area has a higher priority than said detection of the position of the line of sight in a first photographing mode and said detection of the position of the line of sight has a higher priority than said detection of the predetermined area in a second photographing mode different from said first photographing mode.

14. An apparatus, comprising:

a storage device; and a processor configured to execute computer executable instructions recorded on the storage device, the computer executable instructions including instructions, that when executed by the processor, cause the apparatus to:

detect a predetermined area from an object image in an imaging area;

detect a position of a line of sight of a user in the imaging area;

select a photographing mode from a plurality of photographing modes;

determine priorities of detect the predetermined area and detect the position of the line of sight according to the selected photographing mode; and determine a focus detection point at which focus detection is to be performed, according to the determined priorities, wherein the priorities of detect of the predetermined area and detect the position of the line of sight are determined such that the detect the predetermined area has a higher priority than the detect the position of the line of sight in a first photographing mode and the detect the position of the line of sight has a higher priority than the detect the predetermined area in a second photographing mode different from the first photographing mode.

* * * * *